(12) United States Patent
Tross et al.

(10) Patent No.: US 11,543,930 B2
(45) Date of Patent: Jan. 3, 2023

(54) AUGMENTING WEB APPLICATIONS WITH OPTIMIZED WORKFLOWS SUPPORTING USER INTERACTION

(71) Applicant: RealFar Ltd, Tel-Aviv (IL)

(72) Inventors: Yaniv Shaul Tross, Tel-Aviv (IL); Guy Schlider, Ramat-Gan (IL)

(73) Assignee: RealFar Ltd, Tel-Aviv (IL)

( * ) Notice: Subject to any disclaimer, the term of this patent is extended or adjusted under 35 U.S.C. 154(b) by 0 days.

(21) Appl. No.: 17/523,038

(22) Filed: Nov. 10, 2021

(65) Prior Publication Data
US 2022/0147197 A1    May 12, 2022

Related U.S. Application Data

(60) Provisional application No. 63/111,683, filed on Nov. 10, 2020.

(51) Int. Cl.
*G06F 17/10*    (2006.01)
*G06F 3/0481*    (2022.01)
(Continued)

(52) U.S. Cl.
CPC ........ *G06F 3/0481* (2013.01); *G06F 3/04847* (2013.01); *G06F 9/451* (2018.02);
(Continued)

(58) Field of Classification Search
CPC .... G06F 3/0481; G06F 3/04847; G06F 9/451; G06F 16/9566; G06F 40/103; G06F 21/629
See application file for complete search history.

(56) References Cited

U.S. PATENT DOCUMENTS 5,774,661 A * 6/1998 Chatterjee ............. G06F 9/5038
709/238
6,826,579 B1 * 11/2004 Leymann ............... G06Q 10/06
717/103
(Continued)

FOREIGN PATENT DOCUMENTS

CA    2902454 C  *  1/2020
CN    107659433 A  *  2/2018  ............. G06N 3/126
(Continued)

OTHER PUBLICATIONS

Anugraha, Pearlyn, "Integromat, Blendr.io, and Workato—Zoho Mail integrates with more iPaaS platforms" (Year: 2019).*
(Continued)

*Primary Examiner* — Shahid K Khan

(57) ABSTRACT

Described herein are methods, systems and computer products for supporting user interactive actions in workflows integrating multiple disparate web applications by adding (embedding) one or more User Interface (UI) elements in one or more webpages of one or more web applications and linking them with respective workflows. Users visiting these webpages may engage with the added UI elements to interact with the linked workflows. Further described are methods, systems and computer products for enhancing performance of one or more workflows integrating multiple disparate web applications by adjusting the workflows to asynchronously initiate actions which are independent of each other such that the independent actions are executed simultaneously.

18 Claims, 12 Drawing Sheets

(51) Int. Cl.
  *G06F 9/451* (2018.01)
  *G06F 3/04847* (2022.01)
  *G06F 21/62* (2013.01)
  *G06F 40/103* (2020.01)
  *G06F 16/955* (2019.01)
(52) U.S. Cl.
  CPC ........ *G06F 16/9566* (2019.01); *G06F 21/629* (2013.01); *G06F 40/103* (2020.01)

(56) References Cited

U.S. PATENT DOCUMENTS

| | | | | |
|---|---|---|---|---|
| 7,496,912 | B2 * | 2/2009 | Keller | H04L 41/082 717/174 |
| 8,543,932 | B2 * | 9/2013 | Fields | G06Q 10/06 715/744 |
| 8,689,131 | B2 * | 4/2014 | Ali | G06Q 10/06 715/781 |
| 9,262,239 | B2 * | 2/2016 | Rusu | G06F 9/542 |
| 9,430,207 | B1 * | 8/2016 | Bandhole | H04W 4/50 |
| 9,459,764 | B1 * | 10/2016 | Rosner | H04M 3/5166 |
| 9,466,048 | B2 * | 10/2016 | Liggett | G06F 40/166 |
| 10,545,951 | B1 * | 1/2020 | Lieberman | G06F 16/211 |
| 10,762,471 | B1 * | 9/2020 | Wang | G06F 16/248 |
| 10,885,423 | B1 * | 1/2021 | Voicu | G06F 3/04817 |
| 11,347,565 | B1 * | 5/2022 | Johnson | G06Q 10/103 |
| 2002/0116399 | A1 * | 8/2002 | Camps | G06F 40/166 |
| 2003/0050800 | A1 * | 3/2003 | Brandt | G06F 8/34 705/2 |
| 2004/0078373 | A1 * | 4/2004 | Ghoneimy | G06Q 10/10 |
| 2004/0260590 | A1 * | 12/2004 | Golani | G06Q 10/10 705/7.26 |
| 2005/0010454 | A1 * | 1/2005 | Falk | G06Q 10/10 705/4 |
| 2005/0027495 | A1 * | 2/2005 | Matichuk | G06F 9/45512 703/2 |
| 2005/0027733 | A1 * | 2/2005 | Donahue | G06F 40/151 707/999.102 |
| 2005/0060256 | A1 * | 3/2005 | Peterson | G06Q 40/06 705/37 |
| 2005/0066287 | A1 * | 3/2005 | Tattrie | G06F 8/34 715/769 |
| 2005/0246216 | A1 * | 11/2005 | Rosen, III | G06Q 10/087 705/28 |
| 2006/0005140 | A1 * | 1/2006 | Crew | G06Q 10/06 715/760 |
| 2006/0200748 | A1 * | 9/2006 | Shenfield | G06F 8/70 715/239 |
| 2006/0206890 | A1 * | 9/2006 | Shenfield | G06F 8/20 717/174 |
| 2007/0094638 | A1 * | 4/2007 | DeAngelis | G06F 8/36 717/107 |
| 2007/0244904 | A1 * | 10/2007 | Durski | G06F 8/30 |
| 2007/0255607 | A1 * | 11/2007 | Staby | G06Q 10/0633 705/7.26 |
| 2007/0276689 | A1 * | 11/2007 | Slone | G06Q 10/06 717/109 |
| 2008/0028363 | A1 * | 1/2008 | Mathew | G06F 9/44505 717/104 |
| 2009/0271501 | A1 * | 10/2009 | Shenfield | H04L 67/04 709/219 |
| 2011/0185315 | A1 * | 7/2011 | Armour | G06F 8/34 715/853 |
| 2012/0095585 | A1 * | 4/2012 | Agarwal | G06Q 10/06 700/109 |
| 2013/0085798 | A1 * | 4/2013 | Spatola | G16H 40/20 705/7.12 |
| 2013/0086020 | A1 * | 4/2013 | Addala | G06F 16/958 707/705 |
| 2014/0032606 | A1 * | 1/2014 | Chandler | G06F 8/34 707/798 |
| 2014/0366037 | A1 * | 12/2014 | Berretta | G06F 9/4881 718/106 |
| 2015/0058324 | A1 * | 2/2015 | Kauwe | G06F 16/248 707/722 |
| 2015/0310363 | A1 * | 10/2015 | Duwyn | G16H 15/00 705/7.27 |
| 2016/0034318 | A1 * | 2/2016 | Byreddy | G06F 9/5072 718/105 |
| 2016/0162172 | A1 * | 6/2016 | Rathod | G06F 9/451 715/747 |
| 2016/0335546 | A1 * | 11/2016 | Ptitsyn | G16B 50/00 |
| 2018/0052666 | A1 * | 2/2018 | Zhang | G06F 11/3668 |
| 2018/0074931 | A1 * | 3/2018 | Garcia | G06F 11/3409 |
| 2018/0359266 | A1 * | 12/2018 | Andow | G06F 21/62 |
| 2019/0114060 | A1 * | 4/2019 | Resudek | G06K 9/6201 |
| 2019/0188035 | A1 * | 6/2019 | Nicholson | H04L 67/12 |
| 2020/0057675 | A1 * | 2/2020 | Dias | G06F 9/5083 |
| 2020/0159569 | A1 * | 5/2020 | Bruun | G06F 9/5038 |
| 2021/0019157 | A1 * | 1/2021 | Voicu | G06F 3/0481 |
| 2021/0096887 | A1 * | 4/2021 | Klein | G06F 9/44505 |
| 2021/0109717 | A1 * | 4/2021 | Voicu | G06F 11/3438 |
| 2021/0109722 | A1 * | 4/2021 | Ripa | G06F 9/45512 |
| 2021/0149688 | A1 * | 5/2021 | Newell | G06F 40/186 |
| 2021/0165668 | A1 * | 6/2021 | Verma | G06F 3/04817 |
| 2022/0012025 | A1 * | 1/2022 | Grigore | G06F 8/38 |
| 2022/0083181 | A1 * | 3/2022 | Grigore | G06F 3/0481 |
| 2022/0261120 | A1 | 8/2022 | Tross et al. | |

FOREIGN PATENT DOCUMENTS

| | | | | |
|---|---|---|---|---|
| DE | 102015205464 B4 | * | 12/2019 | ............... G01B 3/22 |
| JP | H09512377 A | * | 12/1997 | |
| WO | WO-2010098864 A2 | * | 9/2010 | ............ G06Q 10/10 |
| WO | WO-2015085281 A1 | * | 6/2015 | ........... G06F 16/258 |

OTHER PUBLICATIONS

Official Action dated Jul. 11, 2022 from US Patent and Trademark Office Re. U.S. Appl. No. 17/738,042. (17 pages).

* cited by examiner

AUGMENTING WEB APPLICATIONS WITH OPTIMIZED WORKFLOWS SUPPORTING USER INTERACTION

RELATED APPLICATIONS

This application claims the benefit of priority under 35 USC § 119(e) of U.S. Provisional Patent Application No. 63/111,683 filed on Nov. 10, 2020, the contents of which are all incorporated by reference as if fully set forth herein in their entirety.

FIELD AND BACKGROUND OF THE INVENTION

The present invention, in some embodiments thereof, relates to enhancing workflows integrating between multiple web applications and, more particularly, but not exclusively, to enhancing workflows integrating between multiple web applications to support user interactive actions and further optimizing the workflows to simultaneously execute actions independent of each other.

With the constant evolution in availability of computer based applications and moreover with the rapid growth in deployment and accessibility of web based services, platforms and applications, clients and organizations around the world use evermore such web based applications and services.

While the web based applications may be disparate as they are provided by different vendors, the clients may require at least some of these web based applications to be integrated together in order to automate tasks comprising actions relating to the disparate web based applications.

Manually creating workflows for integrating different web applications may be time consuming and may require highly expert personnel to accomplish. Manual workflows may further require constant updating which may involve long design cycles which in turn may easily disrupt or slow operations.

To overcome this, automated tools, platforms, services and methods were developed to automate the design, development and/or deployment of such workflows. The automated workflows may significantly reduce the design cycles, accelerate operations and easily scale up.

SUMMARY OF THE INVENTION

According to a first aspect of the present invention there is provided a computer implemented method of supporting user interactive actions in workflows integrating multiple disparate web applications, comprising:
  Receiving instructions to link a workflow to a User Interface (UI) element added to a webpage of a first web application rendered by a web browser, the workflow comprising a trigger event and a plurality of actions. One or more of the plurality of actions relates to one or more second web application. The trigger event and/or one or more of plurality of actions comprise one or more interactive action with a user visiting the webpage.
  Linking the workflow to the added UI element to enable one or more users, using web browsers for rendering the webpage, to engage with the added UI to interact with the workflow by executing one or more of the interactive actions.

According to a second aspect of the present invention there is provided a system for supporting user interactive actions in workflows integrating multiple disparate web applications, comprising one or more processors executing a code. The code comprising:
  Code instructions to receive instructions to link a workflow to a User Interface (UI) element added to a webpage of a first web application rendered by a web browser, the workflow comprising a trigger event and a plurality of actions. One or more of the plurality of actions relates to one or more second web application. The trigger event and/or one or more of plurality of actions comprise one or more interactive action with a user visiting the webpage.
  Code instructions to link the workflow to the added UI element to enable one or more users, using a web browser to render the webpage, to engage with the added UI to interact with the workflow by executing one or more of the interactive actions.

According to a third aspect of the present invention there is provided a computer readable medium comprising program instructions executable by one or more processors, which, when executed by the one or more processors, cause the one or more processors to perform a method according to the first aspect of the present invention.

According to a fourth aspect of the present invention there is provided a computer implemented method of enhancing performance of workflows integrating multiple disparate web applications, comprising:
  Receiving a workflow configured to initiate from a webpage of a first web application and comprising a trigger event and a plurality of actions, one or more of the plurality of actions relates to one or more second web applications.
  Analyzing the plurality of actions to identify dependency between at least some of the plurality of actions.
  Adjusting the workflow to asynchronously initiate actions which are independent of each other.
  Outputting the adjusted workflow for integration in the webpage of the first application such that when the adjusted workflow is initiated the independent actions execute simultaneously.

According to a fifth aspect of the present invention there is provided a system for enhancing performance of workflows integrating multiple disparate web applications, comprising one or more processors executing a code. The code comprising:
  Code instructions to receive a workflow configured to initiate from a webpage of a first web application and comprising a trigger event and a plurality of actions, one or more of the plurality of actions relates to one or more second web applications.
  Code instructions to analyze the plurality of actions to identify dependency between at least some of the plurality of actions.
  Code instructions to adjust the workflow to asynchronously initiate actions which are independent of each other.
  Code instructions to output the adjusted workflow for integration in the webpage of the first application such that when the adjusted workflow is initiated the independent actions execute simultaneously.

According to a sixth aspect of the present invention there is provided a computer readable medium comprising program instructions executable by one or more processors, which, when executed by the one or more processors, cause the one or more processors to perform a method according to the fourth aspect.

In a further implementation form of the first, second and/or third aspects, the workflow integrating the first web application with one or more of the second web applications is implemented using Integration Platform as a Service (iPaaS).

In a further implementation form of the first, second and/or third aspects, the instructions further define visual settings of the UI element added to the webpage, the visual settings define at least an anchor element present in the webpage to serve as a reference point for the added UI element and an offset of the added UI element with respect to the anchor element.

In a further implementation form of the first, second and/or third aspects, the visual settings further define one or more visual attributes of the added UI element, each of the one or more visual attributes is a member of a group consisting essentially of: a text, a symbol, an icon, a font, a font size, a foreground color, a background color, a shape and/or the like.

In an optional implementation form of the first, second and/or third aspects, context information is extracted from the webpage of the first web application and fed to the workflow such that the context information is used for at least one of the plurality of actions.

In an optional implementation form of the first, second and/or third aspects, context information is extracted from one or more Uniform Resource Locators (URL) relating to the webpage of the first web application and fed to the workflow such that the context information is used for at least one of the plurality of actions.

In an optional implementation form of the first, second and/or third aspects, context information is fetched from one or more remote servers according to an identifier of the first web application extracted from a webpage of the first web application and/or from one or more URLs relating to the webpage of the first web application.

In a further implementation form of the first, second and/or third aspects, the added UI element is visible to one or more of the users according to permission rights of the respective users identified according to their credentials.

In a further implementation form of the first, second and/or third aspects, the workflow is configured to execute one or more of the plurality of actions using an embedded authentication profile predefined for one or more of the interactive actions.

In a further implementation form of the first, second and/or third aspects, the workflow is configured to execute one or more of the plurality of actions using a per user authentication profile specifically defined for a respective one of the one or more users for one or more of the interactive actions.

In a further implementation form of the first, second and/or third aspects, the instructions are received via a Graphical User Interface (GUI) presented to one or more operators in a web browser used by the respective operator. The GUI is configured to enable one or more of the operators to adjust one or more webpages of the first web application by adding one or more UI elements such as the UI element. The GUI is further configured to enable one or more of the operators to link each UI element with a respective workflow.

In a further implementation form of the first, second and/or third aspects, the GUI is integrated as an extension in a web browser used by one or more of the operators.

In an optional implementation form of the first, second and/or third aspects, the web browser extension is further configured to transmit information relating to the added UI element to one or more remote servers which log the added UI element including visual settings of the UI element and its linked workflow.

In a further implementation form of the first, second and/or third aspects, the GUI is integrated in the webpage of the first web application using a Software Development Kit (SDK).

In a further implementation form of the first, second and/or third aspects, the webpage of the first web application integrating the GUI is further configured to transmit information relating to the added UI element to one or more remote servers which log the added UI element including visual settings of the UI element and its linked workflow.

In a further implementation form of the first, second and/or third aspects, the workflow and the added UI element are embedded in the web browser used by one or more of the users such that when one or more of the users visit the webpage of the first web application the added UI element is displayed in the webpage to enable the respective user to interact with the workflow linked to the added UI element.

In an optional implementation form of the fourth, fifth and/or sixth aspects, the adjusted workflow is constructed as a multi-tier hierarchical structure constructed of a plurality of tiers each comprising one or more actions, the adjusted workflow is configured to traverse through the plurality of tiers such that each action in each of the plurality of tiers is executed after execution completion of all actions of a next higher tier of the plurality of tiers.

In an optional implementation form of the fourth, fifth and/or sixth aspects, the adjusted workflow is constructed as a directed graph comprising a plurality of actions. The adjusted workflow is configured to traverse through the directed graph such that each action is executed after execution completion of its preceding actions.

In an optional implementation form of the fourth, fifth and/or sixth aspects, the dependency is analyzed based on received dependency data indicative of dependencies between at least some of the plurality of actions.

In a further implementation form of the fourth, fifth and/or sixth aspects, the workflow is integrated in the first web application using an extension in a web browser.

In a further implementation form of the fourth, fifth and/or sixth aspects, the is executed using the extension of the web browser.

In a further implementation form of the fourth, fifth and/or sixth aspects, the workflow is integrated in at least one webpage of the first web application using a Software Development Kit (SDK).

In a further implementation form of the fourth, fifth and/or sixth aspects, a workflow agent integrated in at least one webpage of the first application executes the workflow.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF SPECIFIC EMBODIMENTS OF THE INVENTION

Figure 1:
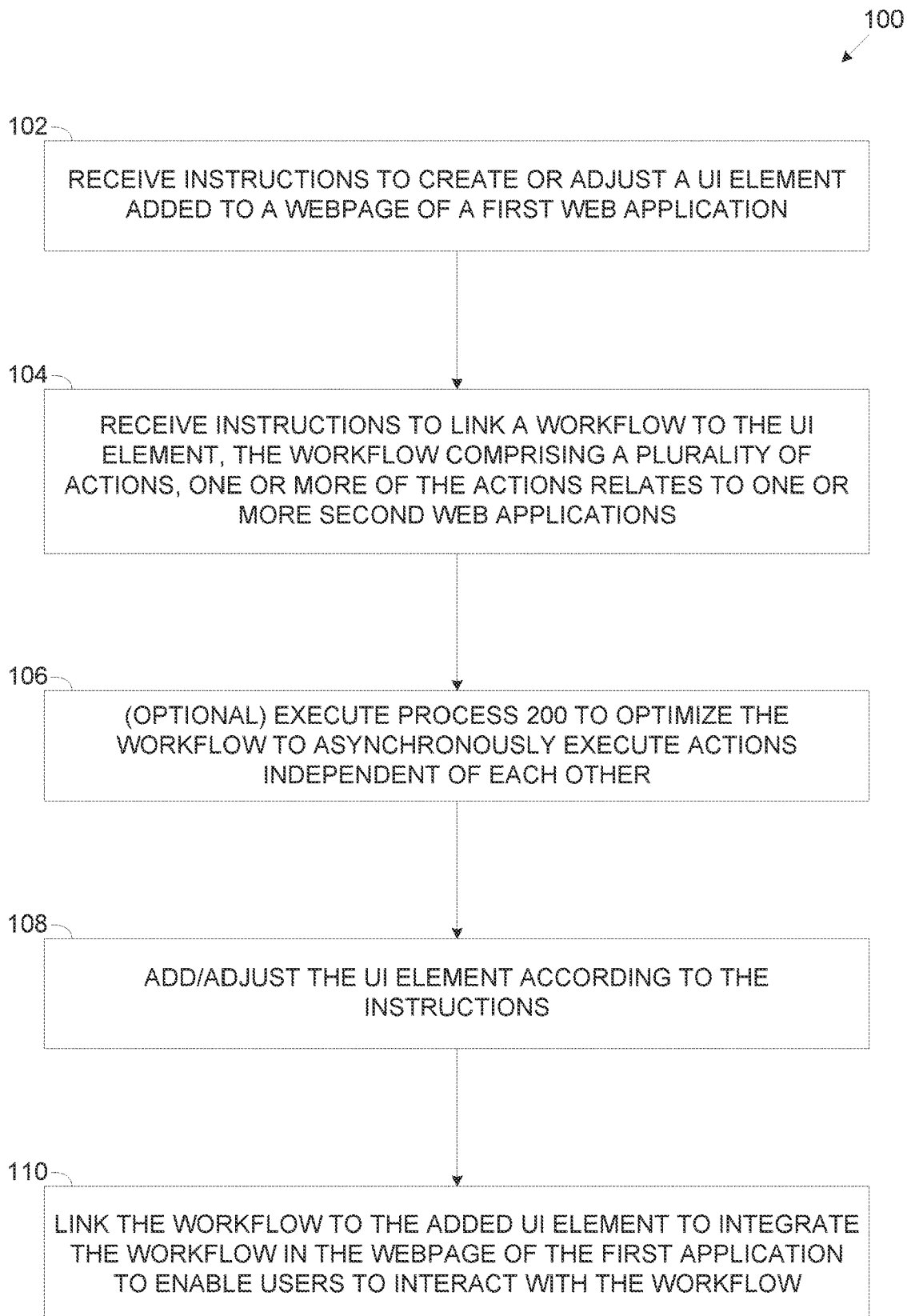
FIG. 1 is a flowchart of an exemplary process of creating a workflow comprising a plurality of actions relating to a plurality of disparate web applications including user interactive actions, according to some embodiments of the present invention.

The present invention, in some embodiments thereof, relates to enhancing workflows integrating between multiple web applications and, more particularly, but not exclusively, to enhancing workflows integrating between multiple web applications to support user interactive actions and further optimizing the workflows to simultaneously execute actions independent of each other.

Workflows, as known in the art, are directed to integrate and automate tasks comprising actions executed, conducted, performed and/or otherwise related to a plurality of disparate web based services, platforms and/or applications collectively designated web applications. Each such workflow may include a trigger event and a plurality of actions related to multiple different and disparate web applications.

The web applications currently available supported by the workflows may encompass a wide range and diversity, for example, electronic mail services and applications (e.g. Google Gmail, Microsoft Outlook, etc.), tasks, calendars and contacts applications (e.g. Google calendar, Microsoft outlook, Todoist, Calendly, etc.), social media platforms and applications (e.g. Facebook, Twitter, Pinterest, etc.), documents and forms editing applications (e.g. google Forms, Gravity Forms, WordPress, etc.), Customer Relationship Management (CRM) applications (e.g. Salesforce, amoCRM, etc.), project management applications (e.g. ClickUp, etc.) and many more.

There exist tools, platforms and/or services which may be used by operators and users to create, construct and/or define workflows according to their needs. Moreover, some of the existing tools, platforms and services may provide a User Interface (UI), specifically a Graphical User Interface (GUI) to enable novice operators and/or users having very limited or even no coding experience to easily create, configure and customize their workflows.

However, existing workflows and tools for creating them are typically limited to execute background tasks and actions which are executed with no human intervention.

According to some embodiments of the present invention, there are provided methods, systems and computer program products for creating workflows integrating multiple disparate web applications which further include one or more interactive actions to support interaction with a user.

In order to facilitate user interaction with the workflow, an operator may define one or more UI elements added to one or more webpages of one or more first web applications and may further link each UI element with a respective workflow comprising a plurality of actions relating to one or more other (second) web applications disparate from the first web application including one or more user interactive actions.

The UI element(s) embedded in the webpage(s) and their linked workflow(s) may be managed and stored by one or more workflow engines executed by one or more network based backend platforms, services and/or severs which may be accessed by users visiting the respective webpage for loading the UI element(s) linked to their associated workflow(s).

The operator(s) may use one or more workflow editor tools, applications and/or services providing a GUI for creating one or more UI elements in one or more webpages of one or more web applications. The workflow editor may further enable the operator(s) to create one or more workflows comprising a plurality of actions including user interactive actions and further link the workflow(s) to one or more of the UI elements. For example, the operator(s) may use a web browser (e.g. Google Chrome, Mozilla Firefox, Microsoft Edge, Safari, Opera, etc.) updated using one or more extensions, plug-ins, add-ons, patches and/or the like to include the workflow editor (creator) including the GUI. Optionally, the operator(s) may use a proprietary web browser designed and configured to include the workflow editor and its GUI.

One or more users using client devices, for example, a computer, a laptop, a tablet, a Smartphone and/or the like may browse the network and may visit one or more of the webpages embedding one or more added UI elements which are linked to respective workflows comprising user interactive actions. The user(s) may typically use a web browser executed by their respective client devices to load and render the visited webpage(s).

While the workflow(s) are typically stored and executed by the remote workflow engines, the UI element(s) linked to the workflow(s) may be rendered by the web browser as part of the visited webpage(s). One or more methods, architectures and/or provisions may be applied to support communication between the with the remote workflow engines.

The web browser may be updated using one or more extensions, plug-ins, add-ons, patches and/or the like to include a workflow agent configured to communicate with the backend platforms to load and render one or more UI elements added to the visited webpage and make the UI element(s) visible to the user(s). The updated web browser may detect one or more trigger events defined in the workflow(s) which linked to the UI element(s) added to the visited webpage to enable the user(s) to interact with the workflow(s) by engaging with the respective UI element(s). The updated web browser may further communicate with the workflow engine(s) to transmit the trigger event(s) to the workflow engine(s) which may execute the respective linked workflows(s) accordingly. Optionally, the updated web browser is utilized by a proprietary web browser designed and configured to communicate with the backend platforms to load and render one or more of the added UI elements as well as transmit the trigger event(s).

Additionally, or alternatively, the workflow agent may be integrated in one or more webpages of one or more of the web applications and may be linked to one or more UI elements to enable users to interact with the workflows. The publisher, provider, designer and/or operator of such web application may integrate and/or embed the workflow agent into one or more webpages of his web application using a Software Development Kit (SDK) which may facilitate use, creation, debugging, testing and/or deployment of workflows including linking the workflows to UI elements in the webpage(s). In such case, since the workflow agent is embedded in the webpage(s), there is no need for updating the web browser to use, interact, create, deploy and/or the like the workflows.

Optionally, one or more of the actions included in one or more of the workflows are executed using and/or according to context information extracted from the respective webpage of the first web application in which respective UI elements linked to the workflows are embedded and/or from one or more Uniform Resource Locators (URL) relating to the respective webpage.

Optionally, one or more of the user interactive actions included in one or more of the workflows are executed using one or more authentication profiles defined for the respective action(s). The authentication profiles may include embedded authentication profiles associated with a user other than the user currently interacting with the workflow. However, the authentication profiles may also include user specific authentication profiles specifically defined for the user currently visiting the webpage and engaging with a UI element to interact with the linked workflow.

Supporting user interaction in workflows may present major advantages compared to existing workflows and methods and systems for creating them.

First, there may be many scenarios in which a fully automated workflow may be highly limited and may fail to accomplish a designated goal. For example, there may be cases in which one or more actions in a workflow may require input data from a user, for example, an operational instruction relating to the workflow and/or to one or more of the actions of the workflow, a selection input in case of conditional execution in the workflow, data that may be used by one or more of the actions of the workflow and/or the like. Such user interaction is not supported by the existing workflow paradigms and hence infeasible using the existing workflow tools, methods and systems.

Moreover, extracting context information relating to the environment of the user, his actions, the webpage currently visited and/or the like may significantly enhance the interaction with the user. For example, based on the extracted context information, additional information may be fetched and presented to the user. in another example, more accurate operations, controls and/or decisions may be made by one or more of the workflow actions based on the extracted context information.

Furthermore, configuring one or more of the workflow's actions to execute using general embedded authentication profiles or user specific authentication profiles may significantly increase flexibility and/or capabilities of the workflow's actions. It is possible to define certain actions to use common embedded authentication profiles associated with certain people regardless of the specific user which currently interacts with the workflow while is also possible to configure other actions to use the authentication profile of the specific user currently interacting with the workflow.

In addition, integrating the workflow creator (editor) as well as the workflow agent in commercially available commonly used web browsers may significantly reduce the effort, costs and/or resources required to deploy these tools for creating and initiating workflows comprising user interactive actions. Additionally, or alternatively, integrating the workflow agent in the webpage(s) of the web applications (using the SDK) may eliminate the need to integrate and/or update the web browsers for creating, deploying and/or interacting with the workflows thus making the workflows accessible to any user using any web browser.

According to some embodiments of the present invention, there are provided methods, systems and computer program products for adjusting and optimizing one or more workflows each integrating a plurality of disparate web applications in order to enhance performance of the respective workflow, for example, reduce execution time, reduce latency, reduce computing resources (e.g. processing resources, storage resources, networking resources, etc.) and/or the like.

A workflow comprising a plurality of actions relating to the plurality of different and disparate web applications may be automatically optimized by adjusting the workflow to asynchronously initiate at least some of the actions which are independent of each other such that the independent actions may execute simultaneously (in parallel).

Adjusting automatically the workflows integrating a plurality of disparate web applications to asynchronously initiate a plurality of actions in parallel may present major benefits and advantages compared to current methods and systems for creating workflows.

First, the existing methods may typically configure the workflows to execute synchronously such that each action is initiated after its preceding action is complete. This may significantly extend the execution time of the workflow and/or the latency of one or more of the actions of the workflow. In contrast, configuring the workflow to asynchronously initiate actions which thus execute in parallel may significantly enhancing the performance of the workflow, for example, reduce the overall execution time of the workflow, reduce the latency of one or more of the actions, reduce computing resources required for executing the workflow and/or the like since actions independent of other actions may initiate sooner and thus complete sooner.

Moreover, while some existing systems and methods may support configuring the workflow to execute asynchronously and initiate a plurality of actions in parallel, such configuration may be a manual task requiring significant skills, knowledge (know how) and/or experience. On the other hand, automatically adjusting the workflow to execute asynchronously may require no such skills or prior knowledge and experience thus making the asynchronously executable workflows highly available and accessible to practically any user.

Furthermore, adjusting workflow to asynchronously initiate actions to execute in parallel may be of particular benefit for workflows comprising user interactive actions. Since the existing methods for creating workflows are directed for generating fully automated workflows requiring no user interaction or intervention, there are no major effects due to prolonged execution time of the workflow and/or due to high latency of one or more of the actions. However, once user interaction is integrated in the workflow and the user is required to interact with the workflow, a prolonged execution time and/or high latency may significantly reduce the user experience of the user who may be compelled to wait for the actions to complete before he may be able to execute the user interactive action(s) included in the workflow.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of creating a workflow comprising a plurality of actions relating to a plurality of disparate web applications including user interactive actions, according to some embodiments of the present invention.

Workflows, as known in the art, are directed to automate tasks comprising actions executed, conducted, performed and/or otherwise related to a plurality of disparate web applications.

An exemplary process 100 may be executed to create a workflow integrating a plurality of disparate web applications and further supporting interaction with a user. In particular, the workflow which includes a trigger event and a plurality of actions relating to the plurality of web applications may be linked to a User Interface (UI) element added to a webpage of a first web application. As such the trigger event and/or one or more of the actions of the workflow may be configured to comprise one or more interactive actions with the user visiting the webpage. The interactive actions may include, for example, receiving input data from a user, for example, information, instructions and/or indications relating and/or required for the workflow and/or to one or more of the actions included in the workflow.

The process 100 is described for creating and linking a single workflow to a single UI element added to a certain webpage of the first application. This however, should not be construed as limiting since the process 100 may be expanded to creating a plurality of workflows linked to a plurality of UI elements added in a plurality of webpages of a plurality of web applications.

Figure 2:
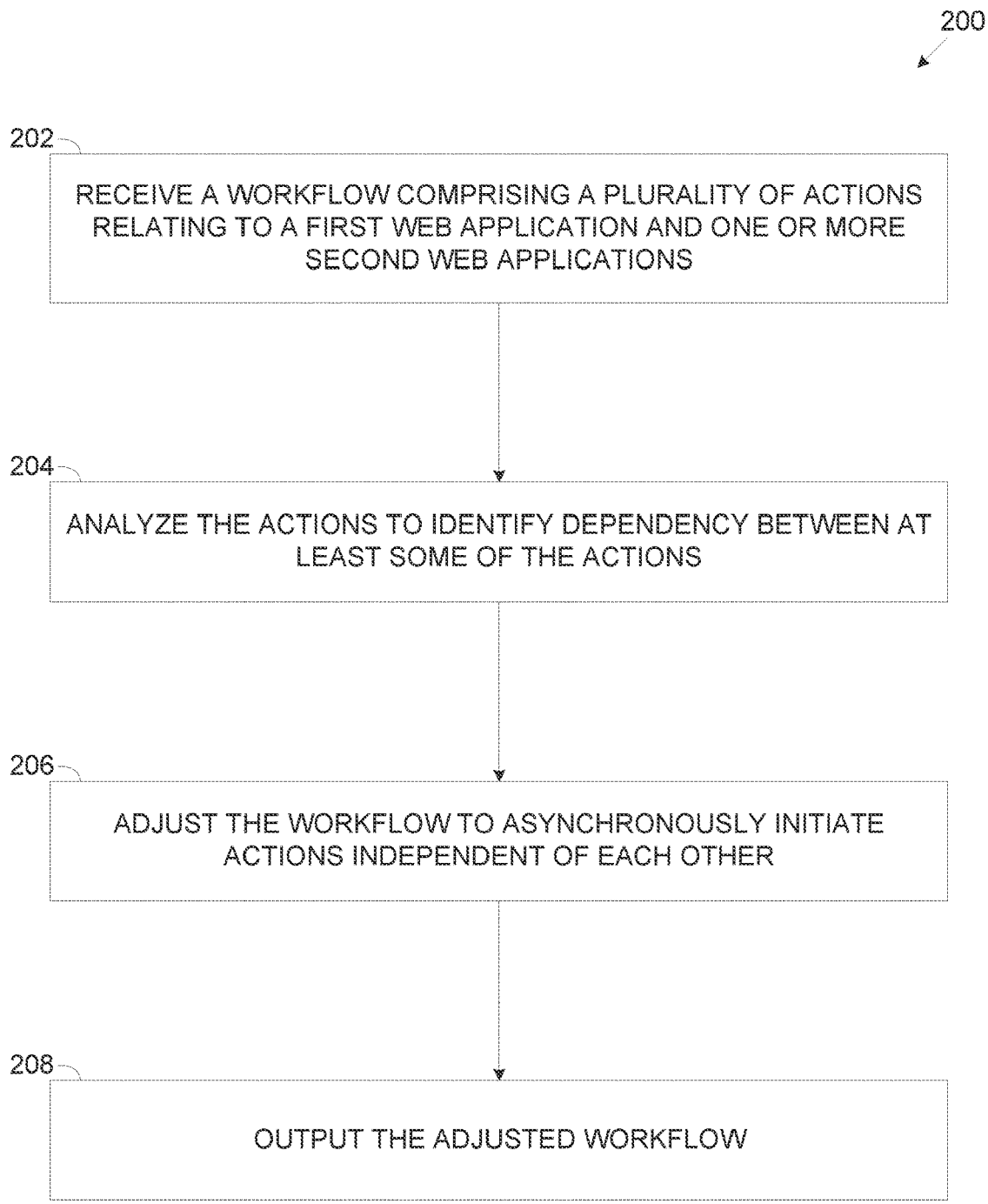
FIG. 2 is a flowchart of an exemplary process of optimizing a workflow integrating multiple disparate web applications to enhance its performance, according to some embodiments of the present invention.

Reference is also made to FIG. 2, which is a flowchart of an exemplary process of optimizing a workflow integrating multiple disparate web applications to enhance its performance, according to some embodiments of the present invention.

An exemplary process 200 may be executed to optimize a workflow integrating a plurality of disparate web applications and as such comprises a plurality of actions relating to a plurality of web applications in order to enhance performance of the workflow, for example, reduce execution time, reduce latency, reduce computing resources (e.g. processing resources, storage resources, networking resources, etc.) and/or the like. The workflow may be optimized by adjusting the workflow to asynchronously initiate at least some of the actions which are independent of each other such that the independent actions may execute simultaneously.

Optionally, the process 100 and the process 200 are combined such that the process 200 is executed to optimize the workflow comprising user interactive action(s) which is linked in the process 100 to the UI element added to the webpage of the first web application.

Figure 3A:
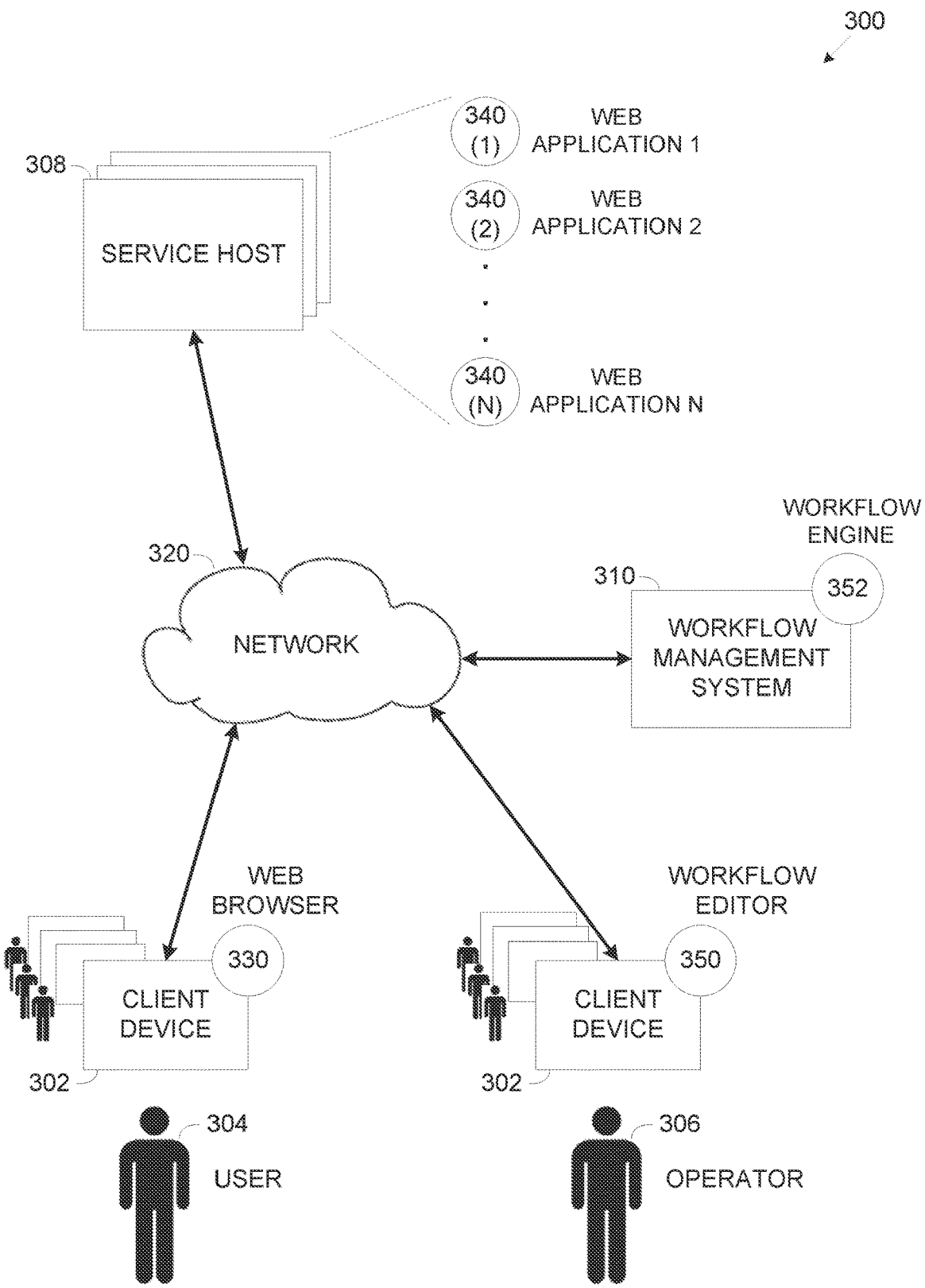
FIG. 3A and FIG. 3B are schematic illustrations of an exemplary system for creating and optimizing a workflow comprising a plurality of actions relating to a plurality of disparate web applications including user interactive actions, according to some embodiments of the present invention.
Figure 3B:
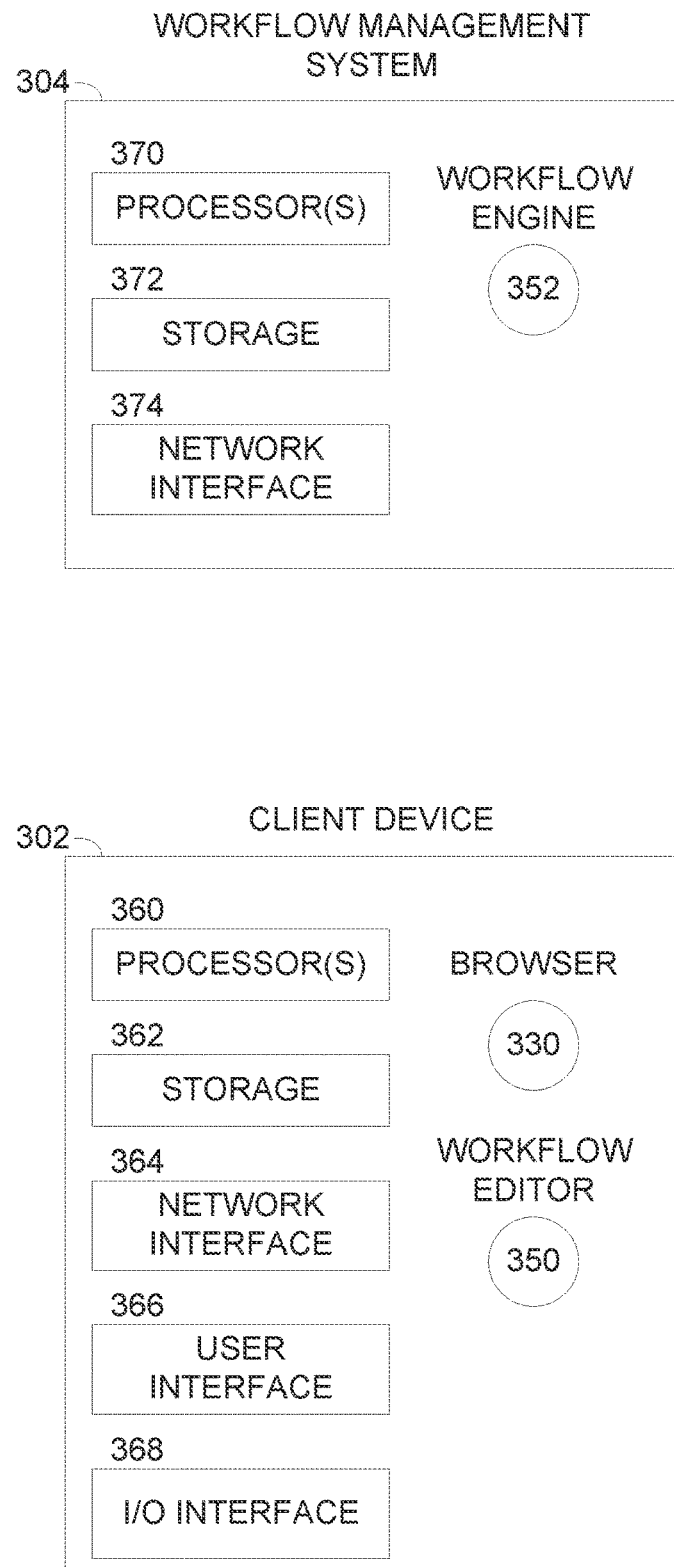

Reference is also made to FIG. 3A and FIG. 3B, which are schematic illustrations of an exemplary system for creating and optimizing a workflow comprising a plurality of actions relating to a plurality of disparate web applications including user interactive actions, according to some embodiments of the present invention. An exemplary system 300 may be used for executing a process such as the process 100 for supporting user interactive actions in workflow integrating multiple web applications and/or a process such as the process 200 for optimizing such workflows.

The system 300 may include a plurality of client device 302, for example, a desktop, a laptop, a work station, a Smartphone, a tablet and/or the like use by respective users 304. The client devices 302 may connect to a network 320 comprising one or more wired and/or wireless networks, for example, a Local Area Network (LAN), a Wireless LAN (WLAN, e.g. Wi-Fi), a Wide Area Network (WAN), a Metropolitan Area Network (MAN), a cellular network, the internet and/or the like to communicate with one or more networked resources.

For example, the users 304 may use their associated client devices 302 to access, via the network 320, one or more service hosts 308, for example, a server, a computing node, a cluster of computing nodes, a cloud service, a cloud platform and/or the like providing a plurality of services and/or applications collectively designated web applications 340, for example, a first web application 340(1), a second web application 340(2) and so on to a Nth web application 340(N).

The web applications 340 may include practically any web application known in the art, in almost any domain, for example, electronic mail services and applications (e.g. Google Gmail, Microsoft Outlook, etc.), tasks, calendars and contacts applications (e.g. Google calendar, Microsoft outlook, Todoist, Calendly, etc.), social media platforms and applications (e.g. Facebook, Twitter, Pinterest, etc.), documents and forms editing applications (e.g. google Forms, Gravity Forms, WordPress, etc.), Customer Relationship Management (CRM) applications (e.g. Salesforce, amoCRM, etc.) and many more.

As seen in FIG. 3B, each client device 302 may include a processor(s) 360, a storage 362 for storing code (program store) and/or data, a network interface 364 comprising one or more wired and/or wireless interfaces for connecting to the network 320 and a user interface 366 for interacting with a respective user 304.

The processor(s) 360, homogenous or heterogeneous, may include one or more processing nodes arranged for parallel processing, as clusters and/or as one or more multi core processor(s). The storage 364 may include one or more non-transitory memory devices, either persistent non-volatile devices, for example, a ROM, a Flash array, a hard drive, an SSD, a magnetic disk and/or the like and/or one or more volatile devices, for example, a RAM device, a cache memory and/or the like.

The processor(s) 360 may execute one or more software modules, for example, a process, a script, an application, an agent, a utility, a tool, an Operating System (OS), a service, a plug-in, an add-on and/or the like each comprising a plurality of program instructions stored in a non-transitory medium (program store) such as the storage 214 and executed by one or more processors such as the processor(s) 212. Optionally, the processor(s) 360 includes, utilizes and/ or applies one or more hardware elements available in the client device 302, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU) and/or the like.

The processor(s) 360 may therefore execute one or more functional modules utilized by one or more software modules, one or more of the hardware modules and/or a combination thereof.

For example, the processor(s) 360 may execute a web browser functional module 330 to communicate with one or more of the service hosts 308 via the network 320 and render one or more webpages of one or more websites, services and/or applications, for example, one or more webpages of one or more of the web applications 340. The web browser 330 may be implemented using a standard commercially available web browser such as, for example, Google Chrome, Mozilla Firefox, Microsoft Edge, Safari, Opera and/or the like. However, the web browser 330 may be implemented as a local agent, mobile application, proprietary software, a proprietary web browser and/or the like configured to communicate with one or more of the service hosts 308 and render webpages of one or more of the web applications 340.

The user interface 368 may include one or more Human-Machine Interfaces (HMI) for interacting with the user 304, for example, a keyboard, a touchpad, a pointing device, a touchscreen, a screen, a digital pen, a speaker, an earphone, a microphone and/or the like.

The client device 302 may further include an Input/Output (I/O) interface 368 comprising one or more wired and/or wireless I/O interfaces, ports, interconnections and/or the like for connecting to one or more external and/or attachable devices, for example, a Universal Serial Bus (USB) interface, a serial interface, a Radio Frequency (RF) interface, a Bluetooth interface and/or the like. Via the I/O interface 368, the client device 302 may communicate with one or more external devices attached to the I/O interface(s), for example, an attachable mass storage device, an external media device and/or the like.

One or more operators 306 may use respective client devices 302 to control, configure, adjust and/or operate one or more of the web applications 340. For example, one or more of operators 306, using their associated client devices 302, may create, adjust and/or otherwise manipulate one or more workflows integrating multiple web applications 340. Each workflow, as known in the art, may include a plurality of actions relating to multiple web applications 340 such that in response to a trigger event in one web application 340 (a first web application 340) a plurality of actions may be initiated where at least some of the actions relate to one or more other web applications 340 (second web application(s) 340). One or more of the workflows may be implemented using Integration Platform as a Service (iPaaS).

To this end, the processor(s) 360 of the client device(s) 302 used by the operator(s) 306 may execute a workflow editor functional module 350 configured to execute the process 100 and interact with the operator 306 for manipulating one or more workflows, for example, create, adjust, alter, delete and/or the like. The workflow editor 350 may further enable the operator(s) 306 to adjust one or more webpages of one or more of the web applications 340 to add one or more UI elements which may be linked to respective workflows to enable one or more of the users 304 to interact with the linked workflows.

Moreover, the workflow editor 350 may provide a Graphical User Interface (GUI) via the user interface 366 to interact with the operator 360 thus enabling the operator 306 to provide instructions for adding UI elements to webpage(s), adjusting UI elements, manipulating workflow(s), linking workflow(s) to UI element(s) and/or the like.

The workflow editor 350 may further execute a process such as the process 200 to optimize one or more of the workflows by analyzing the respective workflow to identify actions independent of each other and adjusting the respective workflow to asynchronously initiate such independent actions such that they are executed simultaneously.

The workflow editor 350 including the GUI may be implemented using a standard commercially available web browser such as the web browser 330, for example, Google Chrome, Mozilla Firefox, Microsoft Edge, Safari, Opera and/or the like. In such embodiments, the workflow editor 350 including the GUI may be integrated as an extension, a plug-in, an add-on, a patch and/or the like in the web browser 330 executed by the client device(s) 302 used by the operator(s) 306. However, the workflow editor 350 may be implemented as a local agent, mobile application, proprietary software, a proprietary web browser and/or the like configured to execute the process 100 and/or the process 200.

Additionally, or alternatively, the workflow editor 350 including the GUI may be integrated in one or more webpages of one or more of the web applications 340. One or more publishers, providers, designers and/or operators of such web application 340 may integrate the workflow editor 350 into one or more webpages of their web applications using an SDK which may facilitate use, creation, debugging, testing and/or deployment of workflows including linking workflows to UI elements in the webpage(s). In such case, since the workflow agent may be embedded in the webpage(s), there may be no need for updating the web browser to include the workflow editor 350.

The system 300 may further include a workflow management system 310 to provide workflow management services, for example, workflow execution, support user interaction with the workflows, i.e., configure the workflows to include user interactive actions which may be initiated by one or more of the users 304 and/or the like.

The workflow management system 310, for example, a serves, a computing node, a cluster of computing nodes and/or the like may include a processor(s) 370 such as the processor(s) 360, a storage 372 such as the storage 362 and a network interface 374 such as the network interface 364. The storage 372 may further comprise one or more local and/or remote network storage resources, for example, a storage server, a Network Attached Storage (NAS), a network drive, a cloud storage service and/or the like accessible via the network interface 374.

As describe for the processor(s) 360, the processor(s) 370 may execute one or more functional modules utilized by one or more software modules, one or more of the hardware modules and/or a combination thereof. For example, the processor(s) 370 may execute a workflow engine 352 to provide the workflow management service, specifically execute one or more of the workflows linked to one or more of the UI elements added in one or more webpages of one or more of 340, save UI elements' information and/or the like.

Optionally, the process 100 and/or the process 200 are executed at least partially remotely, for example, by the workflow management system 310 executing the workflow engine 352. In such implementations, workflow editor 350 may be distributed between the client device 302 used by the operator 306 and the workflow management system 310 executing the workflow engine 352. For example, the client device 302 may execute a local application, for example, a web browser such as the web browser 330, a local agent, mobile application, proprietary software and/or the like to communicate with the workflow management system 310 and serve as an interface for the operator 306 to interact with the remote workflow management system 310, specifically with the workflow editor 350 executing the processes 100 and/or 200.

Optionally, the workflow management system 310 and/or the workflow engine 352 are utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2) and/or the like.

When adding a UI element to a webpage and linking the added UI element to a workflow, the workflow editor 350 may transmit information relating to the added UI element and its linked workflow to the workflow management system 310, specifically to the workflow engine 352 which may store (persist) the data relating to the added UI element and its associated (linked) workflow in one or more storage records, for example, a file, a database and/or the like stored locally and/or remotely, for example, in the storage 372 and/or one or more networked storage resources.

In order to display and enable the added UI elements to the users 340 using their respective client devices 302 executing the web browser 330, the web browser 330 may be updated, for example using a plug-in, an extension, a patch and/or the like to include a workflow agent configured to initiate one or more workflows linked to one or more respective UI elements added in one or more webpages of one or more of the web applications 340. The updated web browser 330 may communicate with the workflow management system 310, specifically with the workflow engine 352 and fetch information required for rendering the added UI element(s). In particular, the updated web browser 330 may fetch from the workflow engine 352 data relating to a webpage of a web application 340 currently rendered by the updated web browser 330, data relating to a trigger of one or more workflows linked to one or more UI elements added and rendered in the currently rendered webpage, data relating to a Uniform Resource Locator (URL) relating to the currently rendered webpage, data relating to the currently executed web application 340 and/or the like.

The updated web browser 330 may further communicate with the workflow engine 352 to transmit trigger event data relating to one or more trigger events detected while rendering the webpage including the added UI element(s). In response, the workflow engine 352 may execute the triggered workflow(s).

Additionally, or alternatively, the workflow agent may be integrated in one or more webpages of one or more of the web applications 340 using an SDK as described herein before for the workflow editor 350. In such case, there may be no need for updating the web browser 330 to include the workflow agent. Rather, a workflow agent instance embedded in a webpage of a web application 340 and optionally linked to a UI element may be initiated once the webpage is rendered by the web browser 330. In such case, the workflow agent instance embedded in the webpage may communicate with the workflow engine 352 to fetch the related data, transmit the trigger event data and/or the like. In such case, since the workflow agent may be embedded in the webpage(s) of the web application(s) 340, the web browser 330 may not be updated to include the workflow agent.

As shown at 102, the process 100 starts with the workflow editor 350 receiving instructions from the operator 306 to create and/or adjust a UI element added to a webpage of a first web application 340. As described herein before the workflow editor 350 may be executed locally by the client device 302 used by the operator 306 and/or remotely by a remote server and/or service, for example, the workflow management system 310.

The instructions may define one or more visual settings of the UI element added and/or adjusted in the webpage. The visual settings may define a location of the added/adjusted UI element in the webpage and/or the website of the first web application 340. For example, the visual settings may define an anchor element present in the webpage which serves as a reference point for the added and/or adjusted UI element. The anchor element may be any node in the Hypertext Markup Language (HTML) Document Object Model (DOM) of the webpage and/or the website identified by a Cascading Style Sheets (CSS) selector. The visual settings may further define an offset of the added/adjusted UI element with respect to the anchor element. For example, the visual settings may include coordinates according to one or more coordinate systems, for example, Cartesian system X/Y/Z dimensions defined by the operator 306 for locating and positioning the UI element added/adjusted in the webpage with respect to the anchor element. In another example, the visual settings may define one or more visual attributes of the added/adjusted UI element, for example, a text, a symbol, an icon, a font, a font size, a foreground color, a background color, a shape and/or the like. For example, the visual settings may define the visual attribute(s) using one or more customized CSS (layout) settings for the added/adjusted UI Elements.

As shown at 104, the workflow editor 350 may receive from the operator 306 instructions to link a workflow to the UI element added and/or adjusted in the webpage of the first web application 340.

The workflow may be defined by the operator 306 to integrate multiple disparate web applications 340 by automating actions executed, conducted and/or performed by several of the web applications 340. The workflow defined to initiate in the context of the first web application 340 and directed to automate tasks relating to multiple web applications 340 may include a trigger event and a plurality of actions of which one or more actions relate to one or more second web applications 340 other than the first web application 340.

Moreover, the trigger event and/or one or more of the actions included in the workflow may include one or more interactive actions with one or more of the users 304 using their respective client devices 302 to visit the webpage of the first web application in which the UI element is added. In particular, when browsing the webpage, the web browser 330 executed by the respective client devices 302 used by one or more of the users 304 may render the webpage including the added/adjusted UI element thus enabling the user(s) 304 to engage with the added/adjusted UI element to interact with the workflow linked to the UI element. The interactive actions may include, for example, receiving input data from the user 304, for example, information, instructions and/or indications relating and/or required for the workflow and/or to one or more of the actions included in the workflow.

As shown at 106, the workflow editor 350 may optionally execute the process 200 to adjust the workflow defined and received from the operator 306 in step 104 in order to optimize the workflow and enhance its performance, for example, reduce execution time, reduce latency, reduce computing resources and/or the like. Optionally, the process 200 is executed by the workflow engine 352. The process 200 is described in detail herein after.

As shown at 108, the workflow editor 350 may add and/or adjust the UI element in the webpage of the first web application 340 according to the instructions received from the operator 306, in particular according to the visual settings included in the instructions for the UI element.

As shown at 110, the workflow editor 350 may link the workflow, defined and received from the operator 306, to the UI element added and/or adjusted in the webpage of the first web application 340 thus associating and correlating the UI element with the respective workflow. In case the process 200 is applied to adjust the workflow to enhance its performance (step 106 of the process 100), the workflow editor 350 may link the adjusted workflow to the UI element added in the webpage of the first web application 340.

The workflow editor 350 may transmit information relating to the added/adjusted UI element to one or more remote servers and/or services, for example, the workflow management system 310, specifically to the workflow engine 352. The related information may include, for example, webpage in which the UI element is added (i.e., the associated webpage), the visual settings of the UI element, the workflow linked and associated with the added UI element and/or the like. The workflow engine 352 may persist, i.e., log and store the received information relating to the added UI element in one or more storage resources, for example, in the storage 372.

The stored UI element information may be retrieved from the workflow management system 310 for loading the UI element and its linked workflow into the webpage of the first web application 340 for one or more of the users 304 visiting that webpage thus enabling the visiting user(s) 304 to engage with the UI element and interact with the workflow linked to the engaged UI element.

In particular, the UI element and its linked workflow may be loaded into the webpage rendered by the web browser 330 executed by the client device(s) 302 used by the visiting user(s) 304. As described herein before, a workflow agent included in an updated version of the web browser 330 and/or integrated in the rendered webpage may be configured to communicate with the workflow management system 310, specifically with the workflow engine 352, for fetching the information relating to the UI element included in the webpage of the first application and rendered by the web browser 330 and its linked workflow. The UI element may be thus presented and visible to the user(s) 304 in the webpage of the first application to enable the user(s) 304 to engage with the UI element and interact with the linked workflow.

Moreover, in addition to associating the UI element with the respective webpage of the first web application 340, the operator 306, operating the workflow editor 350 may instruct and define one or more activation rules. The activation rules may define one or more conditions for loading and presenting the UI element to one or more of the users 304 as well as for activating the entire workflow and/or part thereof for use by the user(s) 304. For example, one or more of the activation rules may define that the UI element may be visible only to valid users 304 having permission rights to view and engage with the UI element. The user(s) may be therefore first authenticated, for example according to their credentials. In another example, one or more of the activation rules may define that the workflow linked (associated) to the UI element may be fully active (i.e., all actions available) only to users 304 having permission rights exceeding a certain threshold level while only part of the actions may be available to user(s) 304 having lower permission rights.

According to some embodiments of the present invention, the operator 306, using the workflow editor 350, may define one or more of the actions in the workflow to be executed according and/or using context information relating to the webpage of the first web application 340. The context information may be extracted, for example, from the webpage itself. In another example, the context information may be extracted from one or more URLs relating to this webpage. In yet another example, the context information may be extracted from the website of the first web application 340.

The context information integrated into the workflow may be extracted in advance by the operator 306, by the workflow editor 350 and/or by the workflow engine 352. However, the workflow may be defined to use context information which is extracted and grabbed in real-time when the webpage is loaded and rendered by the web browser 330.

The context information may be extracted by the web browser 330 updated to include the workflow agent to support execution of the workflow. In such case, the updated web browser 330 may extract the context information and feed it to the workflow such that one or more of the actions included in the workflow may use the extracted context information. Moreover, the updated web browser 330 may communicate with one or more remote network resources, for example, the workflow management system 310, specifically the workflow engine 352, to fetch context information and feed it to the workflow. In particular, the updated web browser 330 may extract an identifier of the webpage in which the UI element is embedded, one or more identifiers of one or more of the URLs relating to the webpage and/or the like and may communicate with the workflow engine 352 to request the context information according to the extracted identifier(s).

However, in case the workflow agent is embedded in the rendered webpage rather than in the web browser 330, the embedded workflow agent may communicate with the workflow management system 310, the workflow engine 352 and/or the like to fetch context information and feed it to the workflow, for example, the webpage identifier, the identifier(s) of the related URL(s) and/or the like and may communicate with the workflow engine 352 to request the context information according to the extracted identifier(s).

Executing actions according and/or using context information may be applied for a plurality of uses and/or goals. For example, assuming the first web application is a CRM application, one or more actions of the workflow may be executed using identification (context) information of a potential lead, for example, a private name, a firm name, a market segment and/or the like extracted from the CRM webpage. In another example, assuming the first web application is an email application, one or more actions of the workflow may be executed using contextual information of an email, for example, sender(s) name, email address(es), file attachment(s), content of email message(s) and/or the like. in another example, assuming the first web application is a project management application, one or more actions of the workflow may be executed using contextual information of one or more tasks, for example, a task name, a task status, an attachment, an owner and/or the like.

Figure 4:
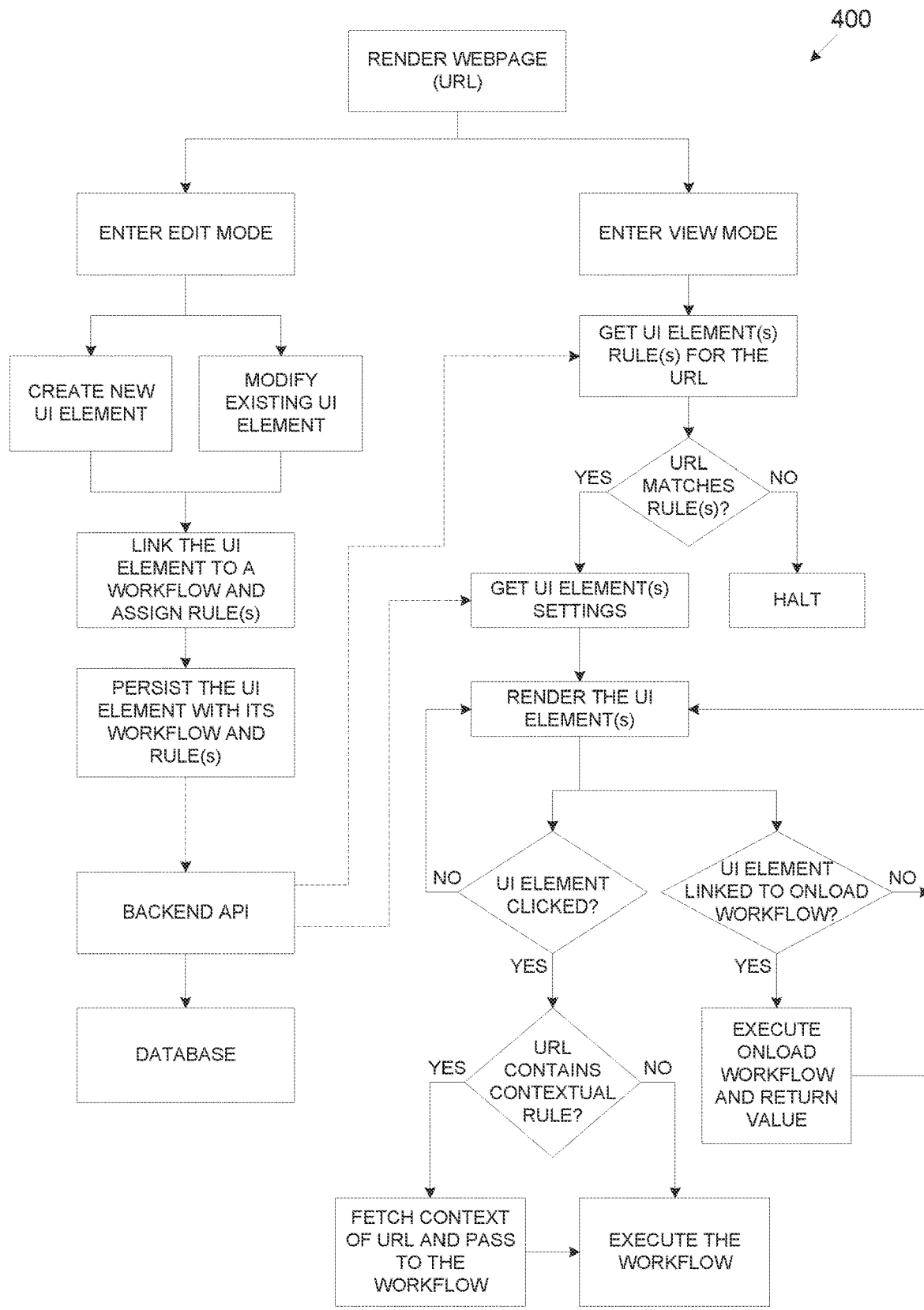
FIG. 4 is a flow chart of an exemplary process of creating and using a User Interface (UI) element added to a webpage of a first application for interacting with a workflow comprising a plurality of actions relating to a plurality of disparate web applications, according to some embodiments of the present invention.

Reference is now made to FIG. 4, which is a flow chart of an exemplary process of creating and using a UI element added to a webpage of a first application for interacting with a workflow comprising a plurality of actions relating to a plurality of disparate web applications, according to some embodiments of the present invention.

An exemplary process 400 may be executed jointly by a web browser such as the web browser 330, optionally an updated web browser 330 such as the updated web browser comprising the workflow agent. Additionally, or alternatively, in case the workflow agent is embedded in one or more webpages of one or more web applications such as the web applications 340 comprising one or more UI elements which are rendered by the web browser 330, the process 400 may be executed by the embedded workflow agent. For brevity, the web browser 330, whether updated to include the workflow agent or not, is referred hereinafter as the web browser 330.

Regardless of whether included in the web browser 330 or embedded in the webpage(s) of the web applications 340, the workflow agent may be configured to communicate with a workflow engine such as the workflow engine 352 executed by a workflow management system such as the workflow management system 310 to receive and transmit data relating to one or more UI elements added in the webpage(s) while the workflow engine 352 may execute the workflow(s) after receiving respective trigger event indication(s) from the workflow agent. The workflow agent may be further updated to operate as the workflow editor 350 for creating the workflow(s) and linking it with respective UI element(s) added (embedded) in the webpage(s) of the web application(s) 340. The web browser part of the process 400 may be therefore executed by a single web browser 330 which may be updated to include the workflow agent supporting two operation modes, an edit mode and a view mode followed in two distinct branches of the process 400. Additionally, or alternatively, the workflow agent embedded in one or more of the webpages of one or more of the web applications 340 is configured to support the two operation modes, namely the edit mode and the view mode followed in the process 400.

One or more operators such as the operator 306 may operate the web browser 330 in the edit mode, i.e., the workflow editor 350, to execute the process 100 for creating one or more of the workflows linked to respective UI elements added to the currently rendered webpage. Using the workflow editor 350, the operator 306 may create one or more new UI elements added to the rendered webpage and/or adjust (modify) one or more UI elements already added in the webpage. In particular, the operator 306 may instruct the workflow editor 350 to create each new and/or modified UI element associated with the rendered webpage, assign it with respective visual settings and link it with a respective workflow. The operator 306 may further instruct the workflow editor 350 to assign one or more activation rules for the respective UI element, for example, visibility and/or activation permission rights for one or more of the users 304.

The information relating to each created/modified UI element may be then persisted and saved. For example, the workflow editor 350 may communicate one or more backend services, for example, the workflow engine 352 to deliver the UI element(s) related information which may be stored by the backend service(s) in one or more storage resources and/or records, for example, a database maintained and/or accessible by the workflow management system 310.

One or more of the users 304 using their associated client device 302 may visit the webpage in which one or more UI elements are added. Optionally, the user(s) 304 may use the web browser 330 updated to include the workflow agent. Additionally, and/or alternatively, the workflow agent may be integrated ad embedded in the visited webpage. Before and/or while loading the webpage, the workflow agent may communicate with the backend service(s) to get (retrieve) information relating to one or more UI elements associated with the rendered webpage and optionally rule(s) relating to the webpage and/or to one or more URLs relating to the rendered webpage.

In case of a match between the retrieved rules and the conditions identified for the respective user 304, the web browser 330 may further communicate with the backend service(s) to get (retrieve) the settings of the UI element(s) applicable for the webpage and the respective user 304, for example, the visual settings of the UI element(s), the respective workflow(s) linked to the UI element(s) and/or the like.

In case of no match, the web browser 330 may halt its operation with respect to UI elements which may be added to the rendered webpage.

In case of a match, the web browser 330, using the UI element(s) settings retrieved from the backend service(s), may render the UI element(s). Moreover, in case a workflow linked to a rendered UI element is configured for onload triggering, i.e., to start executing immediately after loaded, the workflow may be initiated immediately after loaded such that one or more of the actions included in the workflow are executed. In case a workflow is not configured for onload triggering, the web browser 330 may continue rendering the UI element until engaged (clicked) by the user 304. If the UI element is engaged, the workflow agent may check whether the UI element is defined with a contextual rule, i.e., whether context information should be fed to the workflow linked with the UI element for the execution of one or more of the actions included in the workflow. In case it is required, the context information may be extracted and transmitted to the workflow engine 352 which may execute the workflow using the received context information if so required.

According to some embodiments of the present invention, the workflow linked to the UI element may be configured to execute one or more of its actions using a profile, specifically an authentication profile comprising account credentials which may be authenticated. The account credentials may include, for example, a user name, a password, an Application Programming Interface (API) key, a token and/or the like. For example, assuming one or more of the actions of the workflow relates to an email service (340), for example, Google Gmail), the authentication profile may include account credentials for a Gmail email account, for example, danny@gmail(dot)com or john@gmail(dot)com using an OAuth token for the respective account. In another example, assuming one or more of the actions of the workflow relates to a task management application (340), each user may have a respective authentication profile. Further assuming a first profile (account), for example, danny@site(dot)com is used to create a first task, the task management application (340) may save the first task as created by danny@site(dot)com. Similarly, in case a second profile, for example, john@gmail(dot)com is used to create a second task, the task management application (340) may save the second task as created by john@site(dot)com. The authentication profile may be implemented in one or more modes. For example, the authentication profile may include an embedded authentication profile embedded in the workflow with general account credentials such that regardless of the identity of the respective user 304 who interacts with the workflow, one or more of the actions are executed using the same embedded authentication profile. For example, assuming the first web application 340 is a CRM application and further assuming that in case a new lead is identified in the CRM webpage, the user 304 may engage with a UI element added to the CRM webpage to interact with a workflow linked to the UI element to initiate one or more actions of the workflow, for example, send one or more email messages to the newly identified lead. Assuming that the authentication profile defined for these email sending messages actions is an embedded authentication profile, for example, an authentication profile associated with a sales person, no matter the identity and profile of the respective user 304 who interacts with the workflow, the email message(s) will be sent using the embedded authentication profile of the sales person, for example, using the account credentials of the sales person, for example, the name, account name and password of the sales person.

In another example, the authentication profile may include a per user authentication profile which may be specifically defined for each of one or more users 304 for each of one or more actions included in each of one or more workflows. In such implementations, each of one or more actions may be executed using the specific (per) user authentication profile of the respective user 304 visiting the webpage and interacting with the respective workflow via the respective UI element. Continuing the previously presented example, assuming the first web application 340 is the CRM application and further assuming that in case a new lead is identified in the CRM webpage, the respective user 304 may engage with the UI element added to the CRM webpage to interact with the workflow linked to the UI element to initiate one or more actions of the workflow, for example, send one or more email messages to the newly identified lead. Assuming that the authentication profile defined for these email sending messages actions is a per user authentication profile, the email message(s) will be sent using the specific user authentication profile, for every user, of the respective user 304, for example, using the account credentials of the respective user 304.

Figure 5:
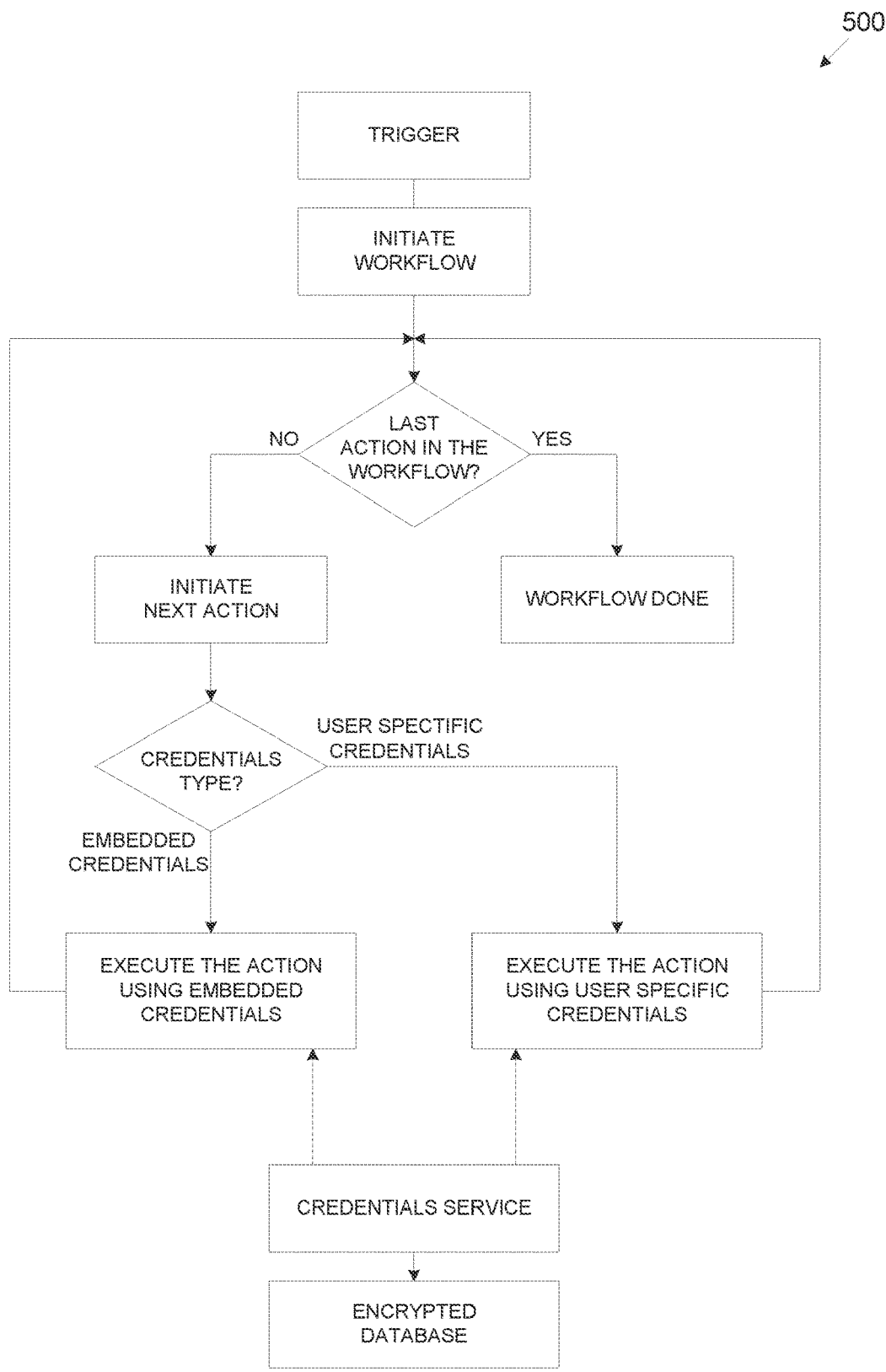
FIG. 5 is a flow chart of an exemplary process of executing actions of a workflow using embedded or user specific authentication profiles, according to some embodiments of the present invention.

Reference is now made to FIG. 5, which is a flow chart of an exemplary process of executing actions of a workflow using embedded or user specific credentials, according to some embodiments of the present invention. An exemplary process 500 presents an execution flow of an exemplary workflow linked to a certain UI element embedded in a certain webpage of a certain web application such as one of the web applications 340. The Workflow may comprise a plurality of actions which may include one or more interactive actions with a user such as the user 304.

A certain user 304 using a client device such as the client device 302 may browse and visit the certain webpage which embeds a certain UI element linked to the workflow comprising the interactive action(s). The client device 302 may execute a web browser such as the web browser 330, optionally a web browser 330 updated to include the workflow agent to support initiation of one or more workflows linked to one or more UI elements embedded in one or more webpages of one or more of the web applications 340.

As stated herein before, the workflows may be executed by a workflow management system such as the workflow management system 310, specifically by a workflow engine such as the workflow engine 352. However, since the workflows may be triggered by events relating to the visited webpage, the trigger event may be detected and transmitted to the workflow engine 352 by the workflow agent, either included in the updated web browser 330 and/or embedded in the visited webpage which may communicate with the workflow engine 352 to fetch information relating to the certain UI element embedded in the certain webpage and may render the certain webpage including the certain UI element to make it visible to the certain user 304 such that the certain user 304 may engage with the certain UI element to interact with the workflow.

After detecting a trigger event, the workflow agent may initiate the workflow linked to the UI element by transmitting the trigger event to the workflow engine 352 optionally with additional information relating to the visited webpage, to interaction of the user 304 with the UI element and/or the like. The workflow engine 352 may then execute the actions included in the workflow. For example, the actions may be executed sequentially such that after completion of each action, the next action is executed until all actions are executed and the workflow execution is done. For each action in the workflow, the workflow engine 352 may check whether it includes an interactive action and in case it does, the workflow engine 352 may further check which authentication profile, i.e. which account credentials should be used for executing the respective action.

In case the respective action is defined in the workflow to use an embedded authentication profile. i.e. embedded credentials, the workflow engine 352 may execute the respective action using embedded credentials. The embedded authentication profile may be actually embedded in the workflow, i.e. hard coded in the workflow. This however, may present some limitation in terms of flexibility, adaptation and/or customization since changing the embedded authentication profile, i.e. the embedded credentials, may require adjustment of the entire workflow. To overcome this, the workflow may include an identifier of an embedded authentication profile. The workflow engine 352 may communicate with a credentials service to obtain the embedded credentials associated with the identifier. The credentials service which out of scope of this application may fetch the associated embedded credentials from one or more databases, for example, an encrypted database and may transmit the embedded credentials associated with the identifier to the workflow engine 352 which may then execute the respective action using the embedded credentials.

In case the respective action is defined in the workflow to use a user specific authentication profile. i.e. user specific credentials, the workflow engine 352 may execute the respective action using the credentials of the certain user 304 interacting with the workflow embedded credentials. To this end, the workflow engine 352 may extract an identifier of the certain user 304 and may communicate with the credentials service to obtain the credentials of the certain user 304 identified by his identifier. The credentials service may fetch the credentials of the certain user 304 from the encrypted database and may transmit them to the workflow engine 352 which may then execute the respective action using the credentials of the certain user 304.

According to some embodiments of the present invention, one or more of the actions included in one or more of the workflows linked to one or more respective UI elements added to one or more webpages of one or more of the web applications 340 are directed to augment respective webpage(s) in which the UI element(s) are embedded to enrich the respective webpage(s) with additional information presented to the user such that the user may have a more comprehensive view of information relating to the respective webpage(s).

The additional information may be retrieved, for example, by the workflow engine 352 from one or more sources. The workflow engine 352 may transmit the fetched additional information and/or part thereof to the workflow engine, included in the updated web browser 330 and/or embedded in the respective webpage(s), which may display the additional information to the user 304 via the user interface 366, for example, on the screen of the client device 302. For example, assuming a certain workflow linked to a UI element embedded (added) in a certain webpage of a first web application 340 rendered by the web browser 330 comprises a certain (read) action indicating fetching additional information from one or more of the other (second) web applications 340. In such case, the workflow engine 352 executing the read action as part of the workflow may communicate with the second web application(s) 340 and fetch the additional information defined by the read action. The workflow engine 352 may transmit the additional information to the workflow agent which may then augment the presentation of the certain webpage of the first web application 340 to include the additional information and/or part thereof to the user 304. For example, assuming a trigger event of a certain workflow is a load action conducted by the web browser 330 of the URL of a certain contact (lead) in a CRM application (340). Further assuming the workflow includes a read action for searching and fetching a most recent email received from the contact in the Gmail service (340). In such case, the workflow engine 352 may receive the trigger event from the workflow agent, fetch the latest email message received from the contact and may transmit it back to the workflow agent which may augment the rendered webpage to present the latest email message to the user 304.

According to some embodiments of the present invention, augmenting one or more of the webpages may be done using augmentation tables which may be defined for one or more of the actions of one or more of the workflows linked to one or more UI elements added in one or more webpages of one or more of the web applications 340. Each augmentation table created for a respective web application 340 may define, for example, which additional data should be fetched, how the additional data should be added and presented in the respective webpage, which actions may be initiated using the additional data and/or the like. For example, a certain augmentation table may define that for every Google Doc uploaded to a certain folder in the Google Docs service (340), the client which the respective Google Doc corresponds to should be saved in a CRM application (340). In another example, a certain augmentation table may define that in case a certain CRM application (34) does not support saving video files, one or more recorded video files relating to one or more clients (e.g. video conference) should be saved in one or more databases in association with the respective client(s).

Figure 6:
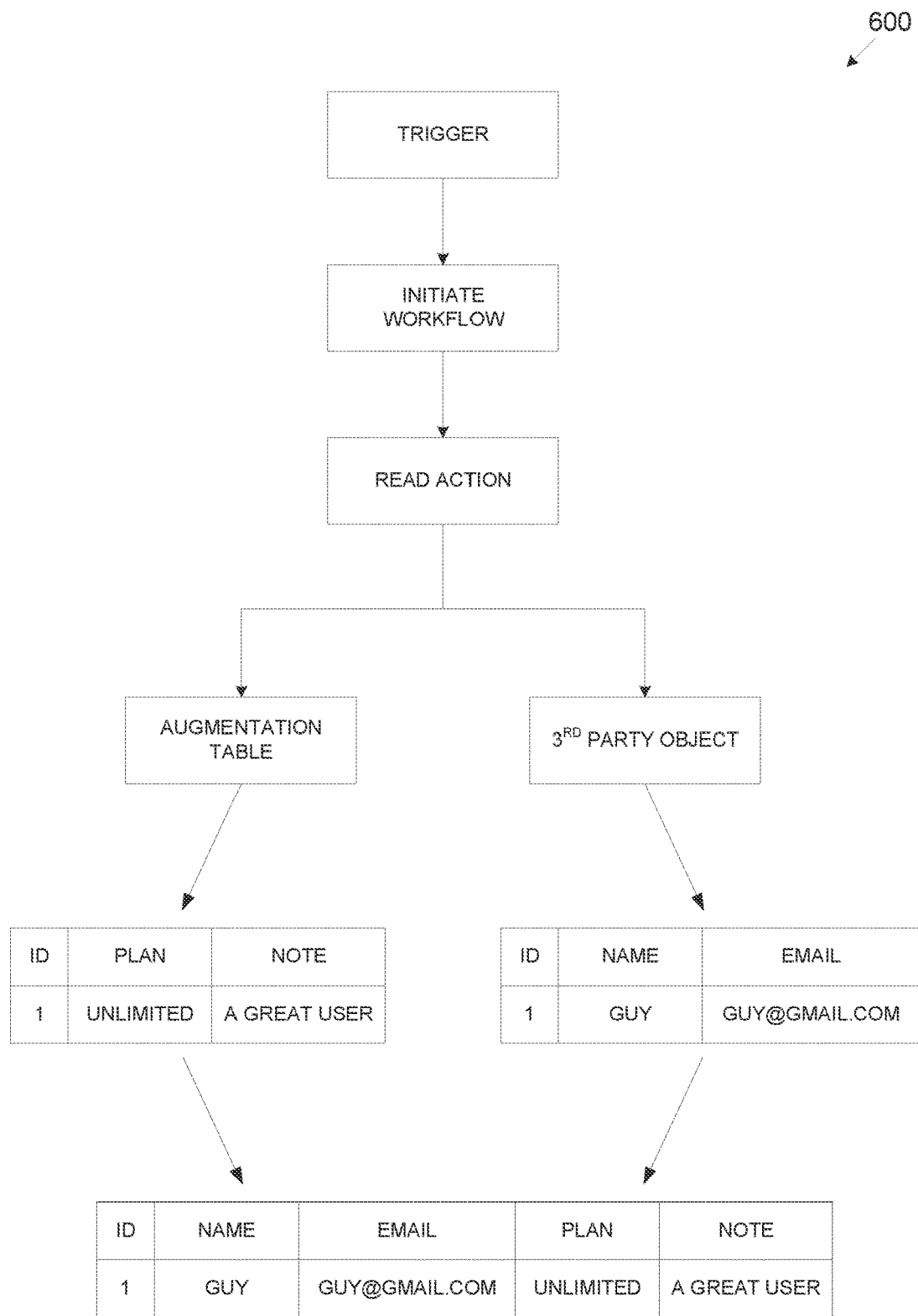
FIG. 6 is a schematic illustration of a sequence for augmenting a webpage of a web application to include additional data according to one or more augmentation tables, according to some embodiments of the present invention.

Reference is now made to FIG. 6, which is a schematic illustration of a sequence for augmenting a webpage of a web application to include additional data according to one or more augmentation tables, according to some embodiments of the present invention. An exemplary process 600 presents an execution flow of an exemplary workflow linked to a certain UI element added in a certain webpage of a certain web application such as one of the web applications 340. The workflow may comprise a plurality of actions which may include one or more read actions for augmenting the certain webpage to present additional information according to one or more augmentation tables.

A certain user 304 using a client device such as the client device 302 may browse and visit the certain webpage which embeds a certain UI element linked to the workflow comprising the read action(s). The client device 302 may execute a web browser such as the web browser 330, optionally a web browser 330 updated to include the workflow agent for supporting initiation of one or more workflows linked to one or more UI elements embedded in one or more webpages of one or more of the web applications 340. However, as described herein before, the workflow agent may be embedded in one or more webpages of one or more web applications 340.

As described herein before, the workflows may be executed by a workflow management system such as the workflow management system 310, specifically by a workflow engine such as the workflow engine 352 while the workflows may be triggered by events relating to the visited webpage. The trigger event may be therefore detected and transmitted to the workflow engine 352 by the workflow agent, included in the updated web browser 330 or embedded in the certain visited webpage, which may communicate with the workflow engine 352 to fetch information relating to the certain UI element embedded in the certain webpage and may adjust and/or augment the certain webpage including the certain UI element to make it visible to the certain user 304 such that the certain user 304 may engage with the certain UI element to interact with the workflow. The workflow agent may further communicate with the workflow to fetch data relating to one or more trigger events defined by the workflow linked to the certain UI element.

While the web browser 330 renders the certain webpage including the certain UI element, the workflow agent may detect a trigger event and may transmit the trigger event to the workflow engine 352 optionally with additional information relating to the rendered certain webpage rendering and/or to user interaction with the certain UI element.

The trigger event may include, for example, one or more text strings inserted (typed) by the certain user 304, for example, using a user interface such as the user interface of the 366 of the client device 302. The text string(s) may include, for example, one or more slash commands, for example, "InsertInvoice" and/or the like.

Optionally, in response to instruction from the workflow agent, one or more UI elements are not initially rendered by the web browser 330 and are displayed to the certain user 304 only after one or more certain events are detected, for example, input from the certain user 304. For example, the web browser 330 may be instructed by the workflow agent to render and display the certain UI element only after the certain user 304 inserts a certain text string. For example, assuming the UI certain UI element comprises a slash command menu, in response to a string inserted by the certain user 304, for example, "/", the workflow agent may instruct the web browser 330 to render and display an auto-complete UI element suggesting possible slash commands from the slash command menu.

After detecting a trigger event is detected, the workflow agent may initiate the workflow linked to the UI element by transmitting the trigger event to the workflow engine 352 optionally with additional information relating to the visited webpage, to interaction of the user 304 with the UI element and/or the like.

The workflow engine 352 may then execute the actions included in the workflow, for example, a read action which is associated with a certain augmentation table defining that one or more additional information items should be displayed to the user 304 by the web browser 330. The additional information may be saved in the certain augmentation table and may be thus regarded as 3rd party objects. For example, assuming the certain webpage is a webpage of a CRM application and includes a table having several columns presenting information relating to a certain client, for example, a type of a communication bundle, for example, unlimited bundle and a classification of the certain client, for example, "a great user". The certain augmentation table associated with the certain webpage may define presenting several additional information items of the certain client, for example, a name, an email address and/or the like stored in the certain augmentation table. The certain client may be associated with a unique identifier, for example, "1" which may be maintained accordingly in the certain augmentation table to associate each client and/or contact with his additional information.

The workflow engine 352 may access the certain augmentation table and may fetch the name and the email address of the certain client associated with the identifier "1". The workflow engine 352 may then transmit the name and email address to the workflow agent which may augment the certain webpage to create an extended table to include additional columns in which the received name and email address of the certain client may be added. The extended table may include information originating from both the CRM application and the contacts application. For example, the extended table may include a first column containing the unique identifier of the certain client. The extended table may include a second column containing the name of the certain client (e.g. Guy) and a third column containing the email address of the certain client (e.g. guy@gmail(dot)com) which are both fetched from the certain augmentation table. The extended table may further include a fourth column containing the description of the communication bundle of the certain client (e.g. unlimited bundle) and a fifth column containing the classification of the certain client (e.g. a great user) which are both extracted from the CRM application.

Optionally, the one or more of the augmentation tables may define that the additional information may be fetched from one or more of the second web applications 340. In such case the identifiers assigned to the clients (contacts) may be maintained across multiple web applications 340 to synchronize the contacts identity across the disparate platforms, services and/or applications 340. Continuing the previous example, the certain augmentation table may define fetching the name and the email address from one or more second web applications 340, for example, a contacts application. In such case, the workflow engine 352 may communicate with the contacts application and request the name and the email address of the certain client associated with the identifier "1". Similarly, the workflow engine 352 may then transmit the name and email address to the workflow agent which may augment the certain webpage to create an extended table to include additional columns containing the received name and email address of the certain client.

Reference is made once again to FIG. 2, which is the flowchart of the exemplary process 200 executed to optimize a workflow integrating a plurality of disparate web applications such as the web applications 340 in order to enhance performance of the workflow, for example, reduce the execution time, reduce the latency, reduce the computing resources. The workflow may be optimized by adjusting the workflow to asynchronously initiate at least some of the actions which are independent of each other such that the independent actions may execute simultaneously.

The process 200 may be executed locally by the client device 302 used by an operator 306 and/or remotely by a remote server and/or service, for example, the workflow executed by the workflow editor 350 which may be executed by the client device 302, by the workflow engine executed by the workflow management system 310 and/or by a combination thereof.

As described herein before, a workflow initiated from a certain web application 340 may integrate multiple disparate web applications 340. The process 200 may be therefore applied to optimize execution of workflows which are added to one or more web applications 340 as described in the process 100. However, the process 200 may be also applied to optimize execution of workflows which are inherently integrated in one or more web applications 340. Such web applications 340, which may be designated "standalone" web applications 340, may be designed built and/or configured to inherently integrate and/or include one or more workflows which may be connected to one another and may be optionally linked to one or more UI elements embedded in one or more webpages of the standalone web applications 340.

As shown at 202, the process 200 starts with the workflow editor 350 receiving a workflow configured to initiate from a webpage of a first web application 340 which comprises a plurality of actions of which at least some relate to one or more other (second) web applications 340.

As shown at 204, the workflow editor 350 may analyze the workflow to identify dependencies between one or more of the actions of the workflow. For example, the workflow editor 350 may identify that the outcome, output, result and/or data of one or more first actions is used by one or more second (other) actions. This means that the second action(s) depend on the first action(s) and may be executed only after the first action(s) complete their execution and/or part thereof. In another example, the workflow editor 350 may identify that input data provided by a user such as the user 304 interacting with one or more first action(s) of the workflow is used by one or more second (other) actions. This means that the second action(s) depend on the first interactive action(s) and may be executed only after first action(s) are executed and the input data is received.

Optionally, the operator 306 operating the workflow editor 350 may provide dependency data relating to one or more of the actions of the workflow, for example, dependencies, constraints, execution conditions and/or the like. For example, the dependency data may be indicative of dependencies between one or more of the plurality of actions of the workflow. For example, the dependency data may define that a certain action of the workflow must be executed before all following actions. In another example, the dependency data may define that a certain action of the workflow must be executed after all preceding actions of the workflow.

As shown at 206, the workflow editor 350 may adjust the workflow according to the dependencies to produce an adjusted workflow configured to asynchronously initiate actions independent of each other. Initiating the actions asynchronously may significantly enhance the performance of the workflow since actions independent of each other may execute simultaneously thus significantly reducing the execution time of the workflow and/or the latency of one or more of the actions.

According to some embodiments, the workflow editor 350 may construct the adjusted workflow as a graph structure, for example, a directed graph comprising a plurality of nodes each corresponding to a respective one of the plurality of actions of the workflow. In particular, the workflow editor 350 may construct the hierarchically structured adjusted workflow such that each branch of the graph comprises only actions which are dependent on each other while other actions independent of the actions in the respective branch are excluded from the respective branch.

This means that the actions in each branch of the graph may be asynchronously initiated independently of actions in other branches of the graph structure. There may, however, be workflows in which a certain action may depend on multiple preceding actions arranged in separate branches. In such case, the multiple dependent action may be executed only after all its preceding actions are complete regardless of which branch they are allocated to.

Figure 7A:
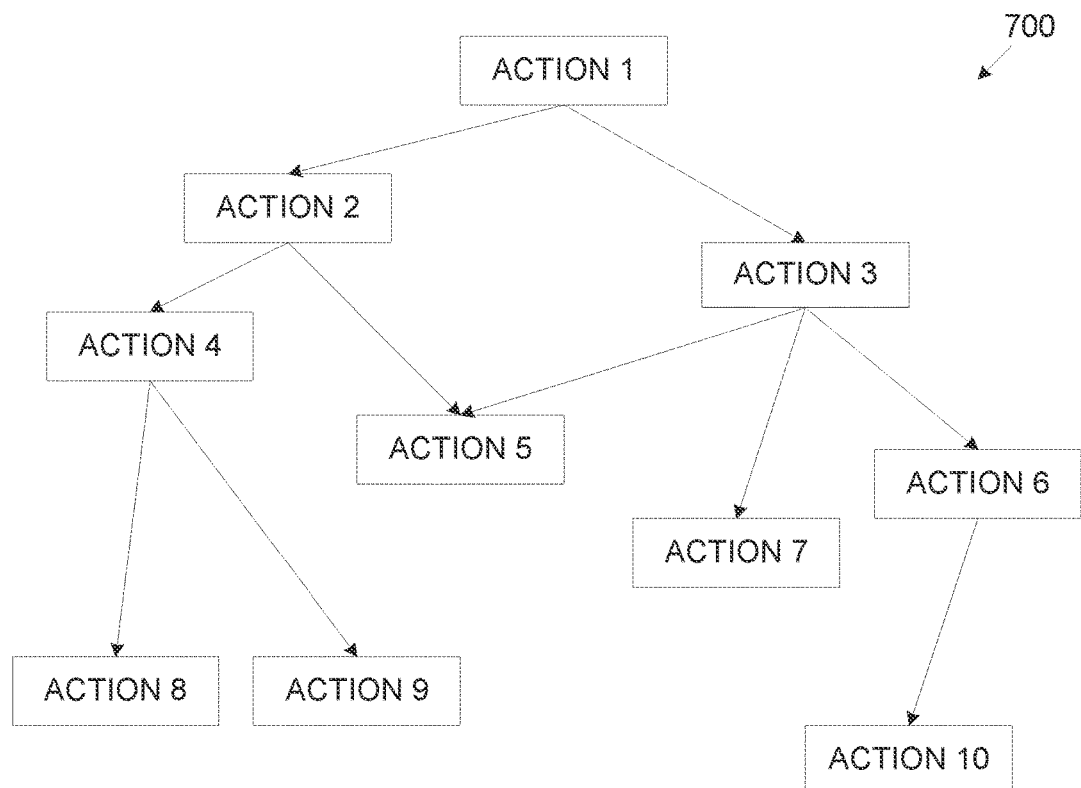
FIG. 7A and FIG. 7B are schematic illustrations of exemplary hierarchical structures applied for optimizing a workflow integrating multiple disparate web applications to enhance its performance, according to some embodiments of the present invention.

Reference is now made to FIG. 7A, which is a schematic illustration of an exemplary graph hierarchical structure applied for optimizing a workflow integrating multiple disparate web applications to enhance its performance, according to some embodiments of the present invention.

An exemplary workflow 700 may be constructed as a graph, for example, a directed graph comprising a plurality of nodes corresponding to a plurality of actions, for example, action 1 through action 10.

As seen, the graph of the workflow 700 comprises two main branches branching from the first action, action 1, which may be a trigger which comprise actions that are mostly independent of each other. For example, a first branch branching from action 1 may include action 2, action 4, action 8 and action 9 while a second branch branching from action 1 may include action 6, action 6, action 7 and action 10.

As such, action 2 for example, may be initiated after completion of action 1 which may be the trigger, action 4 may be initiated after action 2 completes, and actions 8 and 9 may be initiated after action 4 completes. As evident, the actions 2, 4, 8 and 9 which are independent of the actions 3, 5, 6, 7 and 10 may be therefore asynchronously initiated with respect to actions 3, 5, 6, 7. Complementary, action 3 may be initiated after completion of action 1, actions 6 and 7 may be initiated after action 3 completes, and action 10 may be initiated after action 6 completes. As seen, the actions 3, 6, 7 and 10 which are independent of the actions 2, 4, 8 and 9 may be therefore asynchronously initiated with respect to actions 2, 4, 8 and 9.

Moreover, the main branches may include one or more sub-branches, for example, the second branch may include a sub-branch comprising the actions 6 and 10 where the action 10 only depends on the action 6 and is independent of actions 5 and 7. As such the action 10 may be asynchronously initiated after completion of the action 6 independently of actions 57 and 7, i.e. regardless and of the execution state of the actions 5 and 7.

Action 5 however may dependent on actions from the two branches, specifically actions 2 allocated in the first branch and action 3 allocated in the second branch. Action 5 may be therefore initiated only after the actions 2 and 3 complete execution.

According to some embodiments, the workflow editor 350 may construct the adjusted workflow as a multi-tier hierarchical structure constructed of a plurality of tiers (levels). Each of the tiers may include one or more nodes each corresponding to a respective one of the plurality of actions of the workflow. In particular, the workflow editor 350 may construct the hierarchically structured adjusted workflow such that the actions in each of the tiers are independent of each other and may be thus initiated asynchronously with respect to each other and/or execute simultaneously. This means that all actions in the first tier may be asynchronously initiated independently of each other, all actions of a second tier may be synchronously initiated independently of each other, all actions of a third tier may be synchronously initiated independently of each other and so on.

However, the actions in a certain tier may depend on the output, result and/or outcome of one or more actions of a higher tier. The actions of the certain tier may be therefore initiated only after the actions of the higher tier complete executing. In other words, the adjusted workflow is configured to traverse through the plurality of tiers such that each action in each of the plurality of tiers is executed after execution completion of all actions of the next higher tier of the plurality of tiers.

The multi-tier hierarchical structure may be implemented using one or more constructions and/or algorithms as known in the art, for example, a tree, a graph, a directed graph and/or the like.

Figure 7B:

Reference is now made to FIG. 7B, which is schematic illustration of an exemplary multi-tier hierarchical structure applied for optimizing a workflow integrating multiple disparate web applications to enhance its performance, according to some embodiments of the present invention.

An exemplary workflow 702 may be constructed as multi-tier hierarchical structure comprising a plurality of tiers each comprising one or more nodes corresponding to a plurality of actions, for example, action 1 through action 10.

As seen, the multi-tier hierarchical structure of the workflow 702 may multiple tiers, for example, four tiers, tier 0, tier 1, tier 2 and tier 3 each comprising actions which are independent of each other. Tier 0 may include one action which may be the trigger, tier 1 may include three actions 2, 3, and 4 which are independent of each other, tier 2 may include two actions 5 and 6 which are independent of each other, and tier 3 may include four actions 7, 8, 9*m* and 10 which are independent of each other.

As such the actions in each tier may be asynchronously initiated after the action in their preceding (higher) tier are complete. For example, the actions 2, 3 and 4 of tier 1 may be initiated asynchronously to each other after action 1 of tier 0 completes. In another example, the actions 5 and 6 of tier 2 may be initiated asynchronously to each other after completion of the actions of tier 1, i.e., actions 2, 3 and 4. In another example, the actions 7, 8, 9 and 10 of tier 3 may be initiated asynchronously to each other after completion of the actions of tier 2, namely actions 5 and 6.

As shown at 208, the workflow editor 350 may output the adjusted workflow which may be linked to a respective UI element added to the webpage of the first application such that when the adjusted workflow is initiated, the independent actions may be asynchronously initiated and may execute simultaneously.

In particular, after the respective UI element is embedded in the webpage of the first web application 340, one or more users such as the user 304 may visit the webpage using their respective client devices 302 executing the web browser 330, optionally the updated web browser 330. While the web browser 330 renders the webpage, the workflow agent may trigger the adjusted workflow which may execute asynchronously by simultaneously initiating actions which are independent of each other.

Presented herein after are exemplary processes for optimizing workflows to simultaneously execute independent actions based on a graph structure such as the graph based workflow 700 presented in FIG. 7A and the based on a multi-tier structure such as the multi-tier based workflow 702 presented in FIG. 7B.

Figure 8:
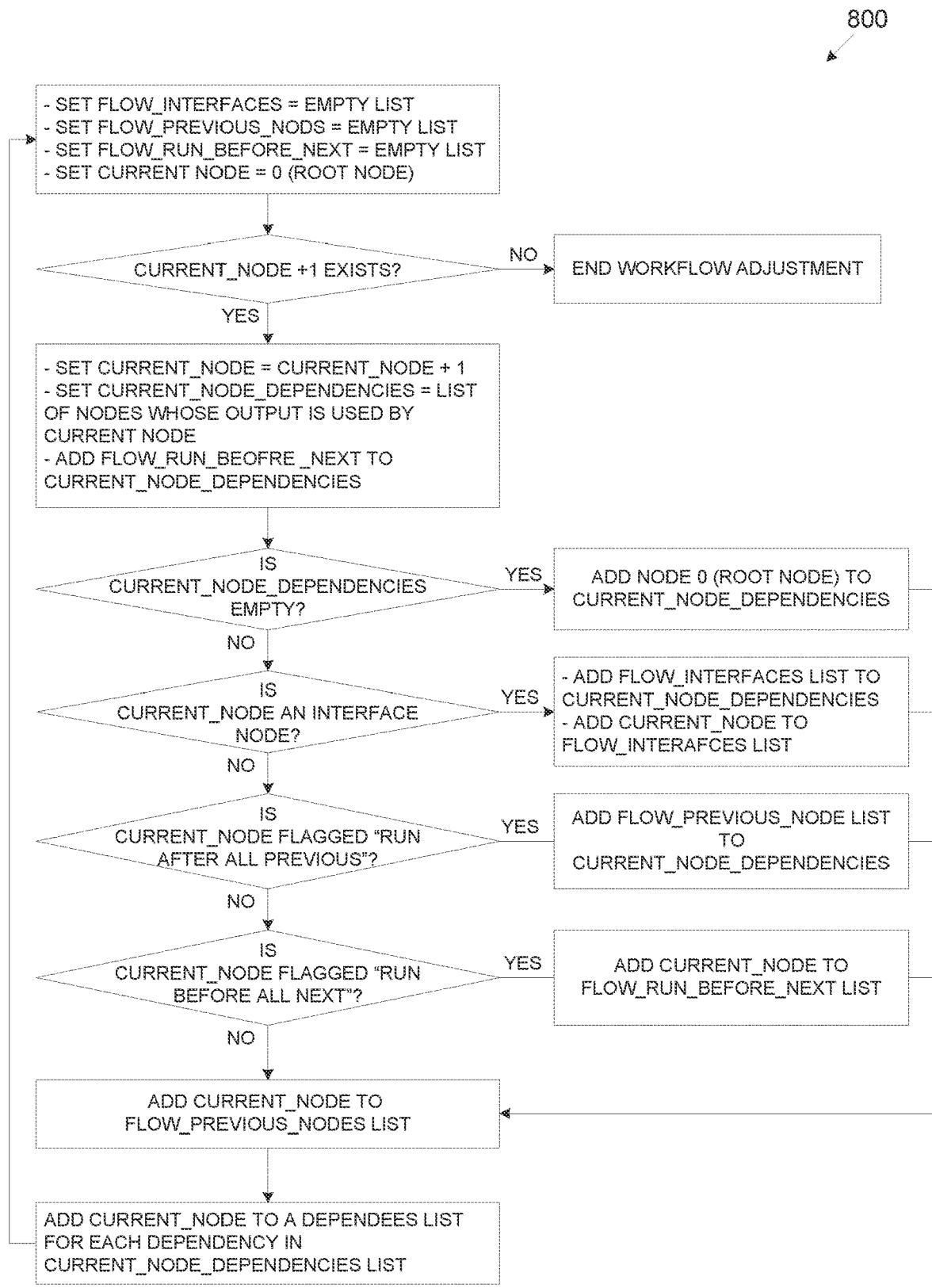
FIG. 8 is a flow chart of an exemplary process of analyzing a workflow comprising a plurality of actions to identify dependencies between actions and optimizing the workflow accordingly based on a graph structure, according to some embodiments of the present invention.

Reference is now made to FIG. 8, which is a flow chart of an exemplary process of analyzing a workflow comprising a plurality of actions to identify dependencies between actions and optimizing the workflow accordingly based on a graph structure, according to some embodiments of the present invention.

An exemplary flow 800 may be executed by a workflow editor such as the workflow editor 350 executed by a client device such as the client device 302, by a workflow management system such as the workflow management system 310 and/or by a combination thereof. The workflow editor 350 may be operated by an operator such as the operator 306 to analyze and adjust a workflow in order to identify dependencies and produce an adjusted workflow in which actions independent of each other may be asynchronously initiated. The adjusted workflow may be optionally constructed as a graph hierarchical structure comprising a plurality of nodes each corresponding to a respective action.

The process 800 may be an iterative process executed by the workflow editor 350 to analyze each of the plurality of nodes (actions) of the workflow and identify decency of the respective node on one or more of the other modes of the workflow. Based on the dependencies of each node, the workflow editor 350 may construct a graph hierarchical structure in which multiple nodes which are independent from each other may execute simultaneously. In particular, each node may be initiate after all the nodes that it depends on have completed their execution.

Optionally, dependency data relating to one or more of the odes may be provided by the operator 306.

For example, one or more of the nodes may be defined as "Run After All Previous" meaning that the respective node must be initiated (executed, run) in a synchronous fashion after all previous nodes have completed their execution. Each such node of the workflow may be thus indicated and/or flagged accordingly, for example, associated with a RUN_AFTER_ALL_PREVIOUS Boolean flag set to true. Other nodes which are not defined as Run After All Previous may be associated with the RUN_AFTER_ALL_PREVIOUS flag set to false.

In another example, one or more of the nodes (actions) may be defined as "Run Before All Next" meaning that the respective node(s) must be initiated in a synchronous fashion before all next (following) nodes. Each such node of the workflow may be thus indicated accordingly, for example, associated with a RUN_BEFORE_ALL_NEXT Boolean flag set to true. Other nodes which are not defined as Run After All Following may be associated with the RUN_BEFORE_ALL_FOLLOWING flag set to false.

During the iterative execution of the process 800, the workflow editor 350 may manage, maintain and/or update one or more lists, variables and/or flags which may be maintained per node and/or globally for the entire workflow structure.

For example, a global FLOW_INTERFACES list may be updated during the process 800 to list all nodes of the workflow which correspond to interface actions, for example, user interface actions. In another example, a global FLOW_PREVIOUS_NODES list may be updated to list all nodes which were already analyzed and processed during the process 800. In another a global FLOW_RUN_BEFORE_NEXT list may be updated during the process 800 to list nodes that need to complete execution before succeeding nodes.

One or more lists may be maintained per node for one or more of the plurality of nodes. For example, a CURRENT_NODE_DEPENDENCIES list may be created and updated for each node during the process 800 to list the dependencies of the respective nodes, i.e., list nodes corresponding to actions that need to complete before the action corresponding to the respective node may be initiated. In another example, a DEPENDENT list may be created and updated for one or more of the nodes to indicate the nodes that depend on the respective node.

As seen in the process 800, the workflow editor 350 may first create the global lists, for example, the FLOW_INTERFACES list, the FLOW_PREVIOUS_NODES list and/or the FLOW_RUN_BEFORE_NEXT list and initialize the lists to be empty lists.

The workflow editor 350 may then start processing the nodes starting from the root node (node 0). After each iteration, the workflow editor 350 may check if there are additional nodes (actions) to be processed. In case there is another node, the workflow editor 350 may process the node and in case there are no additional nodes, the workflow editor 350 may complete the analysis and the adjustment of the workflow and may output the adjusted workflow.

The workflow editor 350 may further increment the CURRENT_NODE so that the next node may be processed in the next iteration of the process 800.

The workflow editor 350 may analyze the input data required by the action corresponding to the currently processed node and include all nodes that provide output, outcome, result and/or data used by the currently processed node in the CURRENT_NODE_DEPENDENCIES list of the currently processed node. The workflow editor 350 may also update the CURRENT_NODE_DEPENDENCIES list to include the nodes listed in the FLOW_RUN_BEFORE_NEXT list.

In case the CURRENT_NODE_DEPENDENCIES list is empty for the currently processed node which is not the root node (node 0), the workflow editor 350 may add the root node to the CURRENT_NODE_DEPENDENCIES list of the currently processed node.

In case the CURRENT_NODE_DEPENDENCIES list of the currently processed node is not empty, the workflow editor 350 may analyze the node to determine and/or check if the node is an interface node. In case currently processed node is an interface node, the workflow editor 350 may update the FLOW_INTERFACES list to include the currently processed node.

The workflow editor 350 may then check the RUN_AFTER_ALL_PREVIOUS flag of the currently processed node and in case it is true, the workflow editor 350 may update the CURRENT_NODE_DEPENDENCIES list of the currently processed node to include all the previously processed nodes listed in the FLOW_PREVIOUS_NODES list.

The workflow editor 350 may further check the RUN_BEFORE_ALL_NEXT flag of the currently processed node and in case it is true, the workflow editor 350 may add the currently processed node to the FLOW_RUN_BEFORE_NEXT list.

The workflow editor 350 may then update the FLOW_PREVIOUS_NODES to include the currently processed node and may further update the DEPENDENT list of each node listed in the CURRENT_NODE_DEPENDENCIES list.

The workflow editor 350 may then initiate another iteration of the process 800 to process the next node of the workflow.

Figure 9:
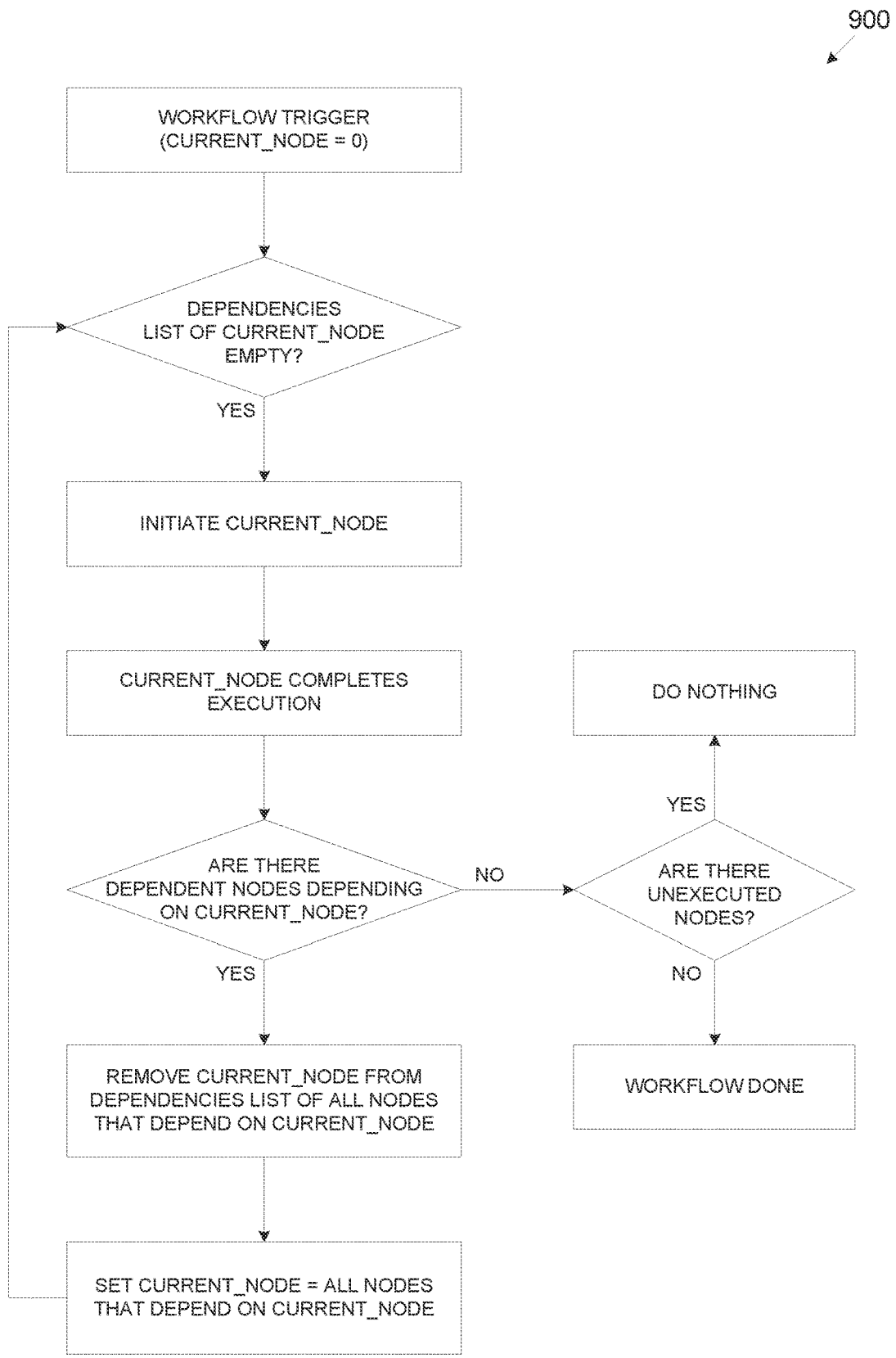
FIG. 9 is a flow chart of an exemplary process of executing a workflow adjusted based on a graph structure to asynchronously initiate actions independent of each other according to their execution order such that the independent actions execute simultaneously, according to some embodiments of the present invention.

Reference is now made to FIG. 9, which is a flow chart of an exemplary process of executing a workflow adjusted based on a graph structure to asynchronously initiate actions independent of each other according to their execution order such that the independent actions execute simultaneously, according to some embodiments of the present invention.

One or more users such as the user 304 may visit a webpage embedding one or more UI elements linked to one or more adjusted workflows optimized to enhance their performance by adjusting the workflow(s) to asynchronously initiate and execute actions independent of each other.

Specifically, the client device(s) 302 used by the visiting user(s) 304 may execute the web browser 330, for example, the web browser 330 updated to include the workflow agent configured to communicate with the workflow engine 352 to initiate the workflows. However, as described herein before, the workflow agent may be embedded in one or more webpages of one or more web applications 340 such that the web browser 330 executed by the client device(s) 302 may be standard web browser which is not updated to include the workflow agent.

While the web browser 330 renders the webpage, the workflow agent may initiate (trigger) the adjusted workflow optionally in response to a request of the user 304. The workflow engine 352 may therefore initiate the root node (node 0) of the workflow which may typically be the trigger node.

Once the workflow is triggered, the workflow engine 352 may traverse the nodes (actions) in of the workflow which may be arranged in a graph hierarchical structure such as the exemplary graph structure 700 illustrated in FIG. 7A and may execute the actions accordingly.

For each processed node, the workflow engine 352 may check its CURRENT_NODE_DEPENDENCIES list to check and/or determine whether the actions corresponding to all nodes that the currently processed node depends on have completed. In case the CURRENT_NODE_DEPENDENCIES list of the currently processed node is not empty, the workflow engine 352 may re-check the CURRENT_NODE_DEPENDENCIES list, periodically or continuously until the list is empty.

Evidently, while the process 900 shows a single flow for processing a single node, the workflow engine 352 may follow multiple instances of the process 900 each for processing a respective one of multiple nodes that may be processed and executed simultaneously, in particular multiple nodes which correspond to actions of the workflow that are independent of each other.

Once the it identifies that the CURRENT_NODE_DEPENDENCIES list of the currently processed node is empty, the workflow engine 352 may initiate (execute, run) the currently processed node, specifically the action corresponding to the currently processed node.

After the action corresponding to the currently processed node completes its execution, the workflow engine 352 may check whether there are other nodes which depend on the currently processed node. for example, the workflow engine 352 may check the DEPENDENT list of the currently processed node to identify the nodes which depend on the currently processed node, specifically on an outcome, result, output and/or data of the action corresponding to the currently processed node.

In case there are no dependent nodes which depend on the currently processed node, the workflow engine 352 may further check whether there are nodes in the workflow which are not executed yet. In case all nodes in the workflow were already executed, the workflow engine 352 may terminate the process 900 since the workflow is done. However, in case there are one or more such unexecuted nodes, the workflow engine 352 may do nothing since the process 900 will repeat for each additional node which is not yet executed until all nodes (actions) of the workflow are initiated and executed.

In case there are one or more dependent nodes which depend on the currently processed node, the workflow engine 352 may update the CURRENT_NODE_DEPENDENCIES list of each node depending on the dependent currently processed node to remove the currently processed node such that the respective dependent node may be initiated and executed, assuming it does not depend on other nodes.

The workflow engine 352 may then set CURRENT_NODE to indicate one or more of the nodes depending on the currently processed node and may repeat the process 900 for the dependent node(s) which, after the currently processed node completed, may be initiated and executed.

Figure 10:
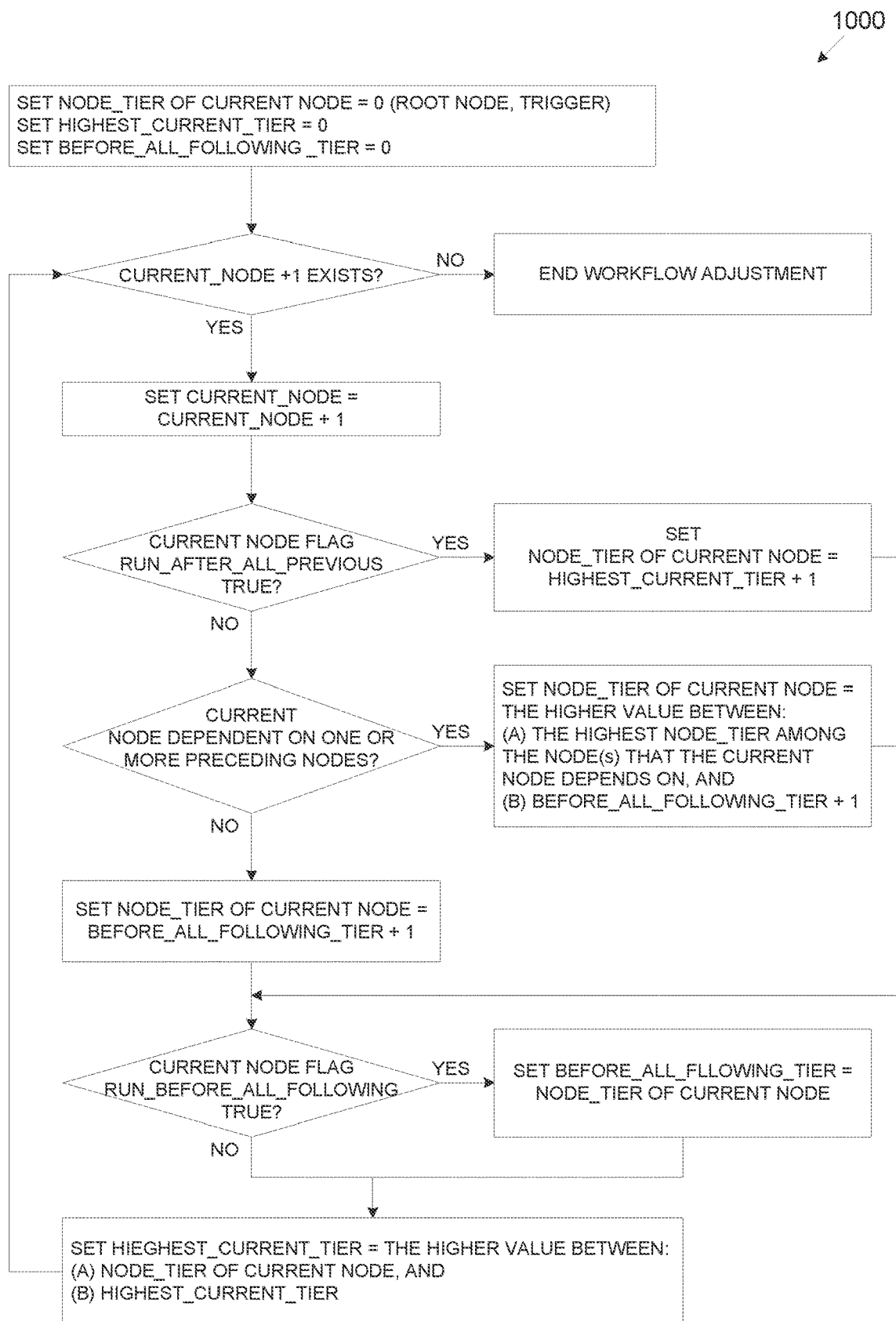
FIG. 10 is a flow chart of an exemplary process of analyzing a workflow comprising a plurality of actions to identify dependencies between actions and optimizing the workflow accordingly based on a multi-tier structure, according to some embodiments of the present invention.

Reference is now made to FIG. 10, which is a flow chart of an exemplary process of analyzing a workflow comprising a plurality of actions to identify dependencies between actions and optimizing the workflow accordingly based on a multi-tier structure, according to some embodiments of the present invention.

An exemplary flow 1000 may be executed by a workflow editor such as the workflow editor 350 executed by a client device such as the client device 302, by a workflow management system such as the workflow management system 310 and/or by a combination thereof. The workflow editor 350 may be operated by an operator such as the operator 306 to analyze and adjust a workflow in order to identify dependencies and produce an adjusted workflow in which actions independent of each other may be asynchronously initiated. The adjusted workflow may be optionally constructed as a multi-tier hierarchical structure comprising a plurality of nodes each corresponding to a respective action.

The workflow editor 350 executing the process 1000 which is an iterative process may analyze a respective one of the plurality of nodes (actions) of the workflow and may place the respective node in one of the tiers of the workflow structure. The workflow editor 350 may determine the tier to place the respective node according to one or more dependencies identified by the analysis and/or based on the dependency data provided by the operator 306.

For example, one or more of the nodes may be defined as Run After All Previous meaning that the respective node(s) must be initiated (run) after all previous nodes in a synchronous fashion. Each such node of the workflow may be thus indicated accordingly, for example, associated with a RUN_AFTER_ALL_PREVIOUS Boolean flag set to true. Other nodes which are not defined as Run After All Previous may be associated with the RUN_AFTER_ALL_PREVIOUS flag set to false.

In another example, one or more of the nodes (actions) may be defined as Run Before All Following meaning that the respective node(s) must be initiated (run) before all following nodes in a synchronous fashion. Each such node of the workflow may be thus indicated accordingly, for example, associated with a RUN_BEFORE_ALL_FOLLOWING Boolean flag set to true. Other nodes which are not defined as Run After All Following may be associated with the RUN_BEFORE_ALL_FOLLOWING flag set to false.

During the iterative execution of the process 1000, the workflow editor 350 may manage, maintain and/or update one or more variables and/or flags which may be maintained per node, per tier and/or globally for the entire workflow structure. For example, a HIGHEST_CURRENT_TIER variable may store a value of the currently highest tier identified in the hierarchical structure. Note that since the hierarchical structure is constructed from top to bottom with the lowest value tier being at the top of the structure, the higher the value of a tier the lower is the tier in the hierarchical structure. For example, the trigger event may be placed in the top most tier, tier 0, the next lower level tier may be tier 1, followed by the next lower level tier 2 and so on. In another example, a BEFORE_ALL_FOLLOWING_TIER variable may store a value for the currently processed tier which may be initially set to 0 and may be updated to the tier value of the currently processed node in case the RUN_BEFORE_ALL_FOLLOWING flag of the currently processed node is true.

As seen, the workflow editor 350 may start processing the nodes starting from the root node set at tier 0. After each iteration, the workflow editor 350 may check if there are additional nodes (actions) to be processed. In case there is another node, the workflow editor 350 may process it and in case there are no additional nodes, the workflow editor 350 may complete the analysis and the adjustment of the workflow and may output the adjusted workflow.

In case the flag RUN_AFTER_ALL_PREVIOUS of the currently processed node is true, the workflow editor 350 may update a NODE_TIER variable of the currently processed node to the value of the HIGHEST_CURRENT_TIER variable+1.

Otherwise, the workflow editor 350 may determine whether the currently processed node depends on one or more preceding nodes and may identify the preceding node(s).

Dependency means that the currently processed node needs the preceding node(s) (action(s)) to complete before it may execute, typically since the currently processed node requires an output and/or an outcome of the preceding node(s).

In case the workflow editor 350 determines that the currently processed node depends on one or more preceding nodes of the workflow, the workflow editor 350 may identify the preceding node having the highest NODE_TIER value among the node(s) the currently processed node depends on, and set the NODE_TIER for the currently processed node to the higher of: the highest NODE_TIER value among the node(s) the currently processed node depends on, and BEFORE_ALL_FOLLOWING_TIER+1.

For example, assuming that node X depends on nodes Y and Z. Further assuming node Y is located in tier 1 and node Z is located in tier 2. Further assuming BEFORE_ALL_FOLLOWING_TIER is 0, the workflow editor 350 may place node X will in tier 2–The higher of (the higher of 1 and 2) and (0+1).

Otherwise, the workflow editor 350 may set the NODE_TIER for the currently processed node to BEFORE_ALL_FOLLOWING_TIER+1.

In case the flag RUN_BEFORE_ALL_FOLLOWING of the currently processed node is true, meaning that the currently processed node has to complete its run before any later nodes initiate, the workflow editor 350 may update the BEFORE_ALL_FOLLOWING_TIER to the NODE_TIER of the currently processed node.

At the end of each iteration, the workflow editor 350 may update the HIGHEST_CURRENT_TIER to the higher of: the NODE_TIER of the currently processed node, and the current HIGHEST_CURRENT_TIER.

the workflow editor 350 may determine whether there is another node to process, and start the process over.

Otherwise, the workflow editor 350 may end the workflow adjustment.

Figure 11:
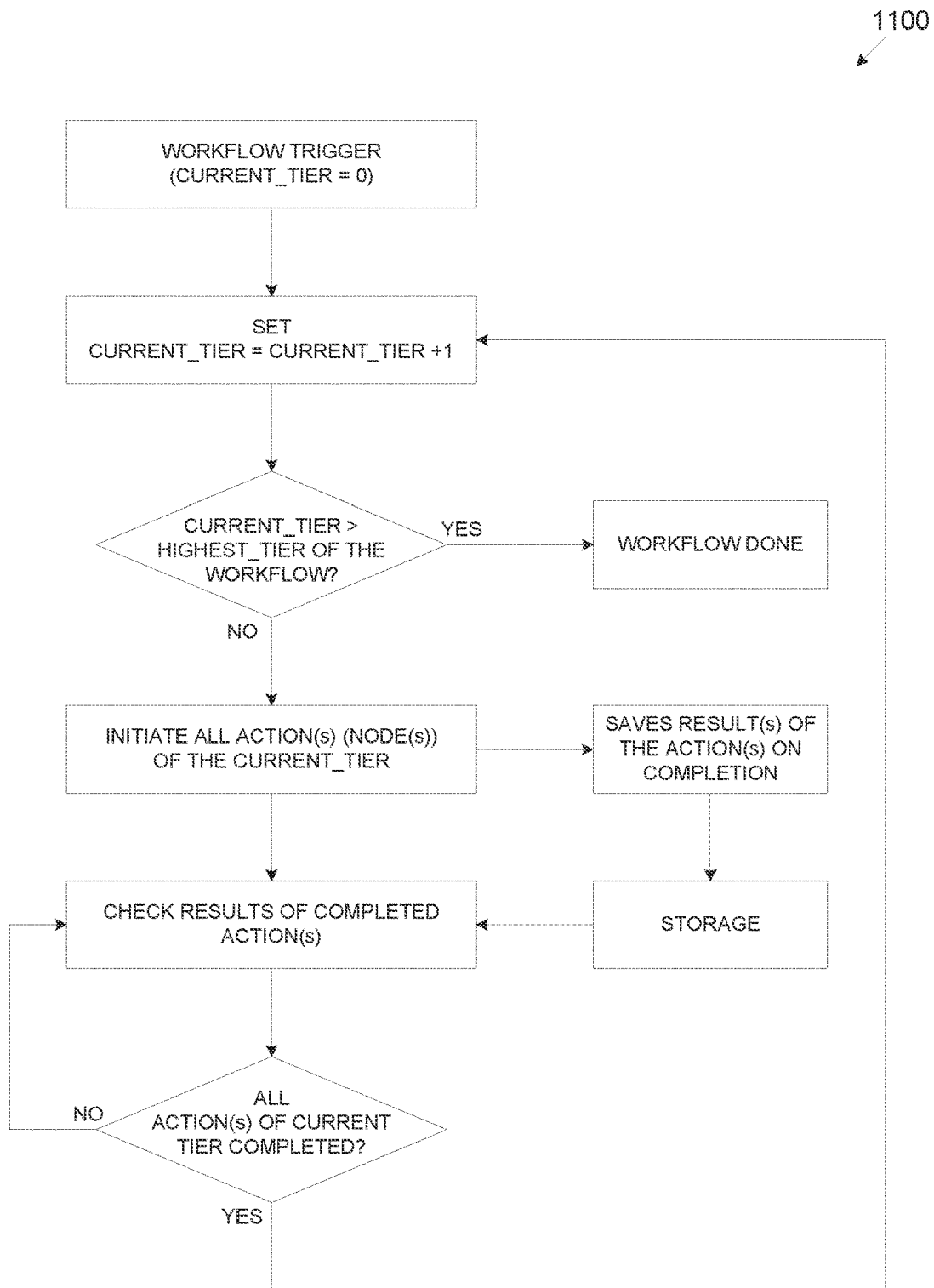
FIG. 11 is a flow chart of an exemplary process of executing a workflow adjusted based on a multi-tier structure to asynchronously initiate actions independent of each other according to their execution order such that the independent actions execute simultaneously, according to some embodiments of the present invention.

Reference is now made to FIG. 11, which is a flow chart of an exemplary process of executing a workflow adjusted based on a multi-tier structure to asynchronously initiate actions independent of each other according to their execution order such that the independent actions execute simultaneously, according to some embodiments of the present invention.

One or more users such as the user 304 may visit a webpage embedding one or more UI elements linked to one or more adjusted workflows optimized to enhance their performance by adjusting the workflow(s) to asynchronously initiate and execute actions independent of each other.

Specifically, the client device(s) 302 used by the visiting user(s) 304 may execute the web browser 330, for example, the web browser 330 updated to include the workflow agent configured to communicate with the workflow engine 352 to initiate the workflows. However, as described herein before, the workflow agent may be embedded in one or more webpages of one or more web applications 340 such that the web browser 330 executed by the client device(s) 302 may be standard web browser which is not updated to include the workflow agent.

While the web browser 330 renders the webpage, the workflow agent may initiate (trigger) the adjusted workflow. For example, the workflow engine 352 may traverse the nodes (actions) in the multi-tier hierarchical structure of the adjusted workflow and may execute the actions accordingly.

For example, the workflow engine 352 may include an exemplary function startWorkflow configured to invoke the workflow after triggered. The function startWorkflow may receive a workflow identifier (ID) as input from the workflow agent included in the updated web browser 330 and/or embedded in the rendered webpage and may load the workflow associated with the received workflow ID.

The function startWorkflow may be further configured to invoke another exemplary function invokeFlowTier included in the workflow engine 352. The function invokeFlowTier configured to invoke (initiate) actions of a certain tier of the plurality of tiers of the adjusted workflow multi-tier hierarchical structure may receive a tierToRun value as an input and may initiate all actions of the tier having a tier number (value) equal to the received tierToRun. In particular, the function invokeFlowTier is configured to simultaneously invoke all the actions of the tier indicated by the received tierToRun.

The workflow engine 352 may include another exemplary function, handleNodeResult, configured to manage and handle the results of the executed actions, for example, collect the result, output and/or outcome of each action which completes its execution and store the collected result/output/outcome coupled with an action (node) ID to correlate the respective stored result/output/outcome with the respective action. The function handleNodeResult may be further configured to mark each action which completes its execution as completed by logging and storing a complete indication associated with the action ID of the completed action. The function handleNodeResult may be configured to return the number of nodes that were invoked (initiated).

The workflow engine 352 may execute the iterative process 1100 to process all tiers of the multi-tier hierarchical structure workflow by first invoking the startWorkflow function which may load and initiate the workflow according to its ID, typically upon receiving the trigger event from the workflow agent included in the updated web browser 330 and/or embedded in the rendered webpage which may optionally be the onload of the workflow. A CURRENT_TIER variable may be thus set to 0.

The workflow engine 352 may then increment the CURRENT_TIER variable by 1 and compare the value of CURRENT_TIER to the value of a HIGHEST_TIER variable indicating the total number of tiers in the invoked workflow.

In case the value of CURRENT_TIER is lower than or equal to the value of the HIGHEST_TIER variable, the workflow engine 352 may process the current tier having a tier number equal to value of CURRENT_TIER by invoking the function invokeFlowTier with the value of CURRENT_TIER to execute all the actions included in the currently processed tier.

The workflow engine 352 may further invoke the handleNodeResult function to monitor completion of execution of the initiated action(s), collect result(s)/output(s)/outcome(s) of the completed actions, store the collected result(s)/output(s)/outcome(s), for example, in the storage 372 of the workflow management system 310 and mark the completed actions as completed in a completion record stored, for example, in the storage 372. After all action(s) of the currently processed tier completed their execution and handleNodeResult recorded and logged them and their result(s)/output(s)/outcome(s) accordingly, the function handleNodeResult may terminate.

The workflow engine 352 may check the completion record, continuously and/or periodically to determine when all the actions of the currently processed tier are complete. The workflow engine 352 may repeat checking the completion record until all actions complete.

After the workflow engine 352 determines that all the action(s) of the currently processed tier completed executing, the workflow engine 352 may initiate another iteration of the process 1100.

In case, after incremented by 1, the value of the variable CURRENT_TIER is higher than the value of the HIGHEST_TIER variable, the workflow engine 352 may determine that the workflow completed its execution and may mark the workflow accordingly as completed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms web application and workflow is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of adding user interactive actions to workflows integrating multiple disparate web applications, comprising:
    receiving instructions to link a workflow, adapted to integrate a plurality of disparate web applications by executing automatically a plurality of actions relating to the plurality of disparate web application, to a User Interface (UI) element added to a webpage of a first web application of the plurality of disparate web applications renderable by a web browser, the workflow comprises a trigger event and a plurality of actions, at least one of the plurality of actions relates to at least one second web application of the plurality of disparate web applications, at least one of plurality of actions comprises at least one interactive action with a user visiting the webpage; and
    linking the workflow to the added UI element;
    wherein, during execution of the workflow after initiated by the trigger event, the at least one interactive action is initiated in response to interaction of at least one user, using a web browser for rendering the webpage, with the added UI.

2. The method of claim 1, wherein the workflow integrating the first web application with the at least one second web application is implemented using Integration Platform as a Service (iPaaS).

3. The method of claim 1, wherein the instructions further define visual settings of the UI element added to the webpage, the visual settings define at least an anchor element present in the webpage to serve as a reference point for the added UI element and an offset of the added UI element with respect to the anchor element.

4. The method of claim 3, wherein the visual settings further define at least one visual attribute of the added UI element, the at least one visual attribute is a member of a group consisting essentially of: a text, a symbol, an icon, a font, a font size, a foreground color, a background color, and a shape.

5. The method of claim 1, further comprising extracting context information from the webpage of the first web application and feeding the extracted context information to the workflow such that the context information is used for at least one of the plurality of actions.

6. The method of claim 1, further comprising extracting context information from at least one Uniform Resource Locator (URL) relating to the webpage of the first web application and feeding the extracted context information to the workflow such that the context information is used for at least one of the plurality of actions.

7. The method of claim 1, further comprising fetching context information from at least one remote server according to an identifier of the first web application extracted from a webpage of the first web application and/or from at least one URL relating to the webpage of the first web application.

8. The method of claim 1, wherein the added UI element is visible to the at least one user according to permission rights of the at least one user identified according to his credentials.

9. The method of claim 1, wherein the workflow is configured to execute at least one of the plurality of actions using an embedded authentication profile predefined for the at least one interactive action.

10. The method of claim 1, wherein the workflow is configured to execute at least one of the plurality of actions using a per user authentication profile specifically defined for the at least one user for the at least one interactive action.

11. The method of claim 1, wherein the instructions are received via a Graphical User Interface (GUI) presented to at least one operator in a web browser used by the at least one operator, the GUI is configured to enable the at least one operator to adjust at least one webpage of the first web application by adding at least one UI element such as the UI element, the GUI is further configured to enable the at least one operator to link each UI element with a respective workflow.

12. The method of claim 11, wherein the GUI is integrated as an extension in a web browser used by the at least one operator.

13. The method of claim 12, wherein the web browser extension if further configured to transmit information relating to the added UI element to at least one remote server which logs the added UI element including visual settings of the UI element and its linked workflow.

14. The method of claim 11, wherein the GUI is integrated in the webpage of the first web application using a Software Development Kit (SDK).

15. The method of claim 14, further comprising the webpage of the first web application integrating the GUI is further configured to transmit information relating to the added UI element to at least one remote server which logs the added UI element including visual settings of the UI element and its linked workflow.

16. The method of claim 1, wherein the workflow and the added UI element are embedded in the web browser used by the at least one user such that when the at least one user visits the webpage of the first web application the added UI element is displayed in the webpage to enable the at least one user to interact with the workflow linked to the added UI element.

17. A system for adding user interactive actions to workflows integrating multiple disparate web applications, comprising:
at least one processor executing a code, the code comprising:
code instructions to receive instructions to link a workflow, adapted to integrate a plurality of disparate web applications by executing automatically a plurality of actions of the plurality of disparate web application, to a User Interface (UI) element added to a webpage of a first web application of the plurality of disparate web applications rendered by a web browser, the workflow comprises a trigger event and a plurality of actions, at least one of the plurality of actions relates to at least one second web application of the plurality of disparate web applications, at least one of plurality of actions comprises at least one interactive action with a user visiting the webpage, and
code instructions to link the workflow to the added UI element;
wherein, during execution of the workflow after initiated by the trigger event, the at least one interactive action is initiated in response to interaction of at least one user, using a web browser for rendering the webpage, with the added UI.

18. A computer program product for adding user interactive actions to workflows integrating multiple disparate web applications, comprising a non-transitory medium storing thereon computer program instructions which, when executed by at least one hardware processor, cause the at least one hardware processor to:
receive instructions to link a workflow, adapted to integrate a plurality of disparate web applications by executing automatically a plurality of actions relating to the plurality of disparate web application, to a User Interface (UI) element added to a webpage of a first web application of the plurality of disparate web applications renderable by a web browser, the workflow comprises a trigger event and a plurality of actions, at least one of the plurality of actions relates to at least one second web application of the plurality of disparate web applications, at least one of plurality of actions comprises at least one interactive action with a user visiting the webpage; and
link the workflow to the added UI element;
wherein, during execution of the workflow after initiated by the trigger event, the at least one interactive action is initiated in response to interaction of at least one user, using a web browser for rendering the webpage, with the added UI.

* * * * *